US011621861B2

(12) United States Patent
Faulkner

(10) Patent No.: US 11,621,861 B2
(45) Date of Patent: Apr. 4, 2023

(54) DYNAMIC GROUPING OF LIVE VIDEO STREAMS AND CONTENT VIEWS

(71) Applicant: MICROSOFT TECHNOLOGY LICENSING, LLC, Redmond, WA (US)

(72) Inventor: Jason Thomas Faulkner, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 321 days.

(21) Appl. No.: 17/091,537

(22) Filed: Nov. 6, 2020

(65) Prior Publication Data

US 2022/0150083 A1    May 12, 2022

(51) Int. Cl.
*H04L 12/18* (2006.01)
*H04L 65/1069* (2022.01)
*H04L 65/1093* (2022.01)
*H04L 65/403* (2022.01)

(52) U.S. Cl.
CPC ...... *H04L 12/1822* (2013.01); *H04L 65/1069* (2013.01); *H04L 65/1093* (2013.01); *H04L 65/403* (2013.01)

(58) Field of Classification Search
CPC ............. H04L 12/1822; H04L 65/1069; H04L 65/1093; H04L 65/403
See application file for complete search history.

(56) References Cited

U.S. PATENT DOCUMENTS

| 7,797,383 B2 | 9/2010 | Baird |
| 8,018,398 B1 | 9/2011 | Harris |
| 8,918,458 B2 | 12/2014 | Lyle et al. |
| 9,065,973 B2 | 6/2015 | Graham et al. |

(Continued)

FOREIGN PATENT DOCUMENTS

WO    2013062581 A1    5/2013

OTHER PUBLICATIONS

"Using Dual Monitors with the Zoom Desktop Client", Retrieved from https://web.archive.org/web/20200427100623/https:/support.zoom.us/hc/en-us/articles/201362583-How-To-Use-a-Dual-Monitor-Display, Apr. 27, 2020, 5 Pages.

(Continued)

*Primary Examiner* — Kristie D Shingles
(74) *Attorney, Agent, or Firm* — Scott Y. Shigeta; Newport IP, LLC

(57) ABSTRACT

The disclosed techniques optimize the use of computing resources and user engagement by dynamically displaying a group of users of a communication session within a designated display area where each user of the group each share a common activity factor. For example, participants can be part of a group displayed in a certain section of a user interface or on a particular display screen if they each share a location, a role, a set of permissions, a team, a contribution level, etc. A system can also allow users of a group to exclusively control content that is displayed within a designated display area associated with the group. By dynamically displaying a group of users and content they control within designated display area by the use of a common activity factor, a system can improve user engagement by enabling users to readily identify people of interest.

20 Claims, 15 Drawing Sheets

(56) References Cited

U.S. PATENT DOCUMENTS

| | | |
|---|---|---|
| 9,338,400 B1 | 5/2016 | Krishnan et al. |
| 10,348,658 B2 * | 7/2019 | Rodriguez ............ H04L 65/762 |
| 10,382,498 B2 | 8/2019 | Xi et al. |
| 2010/0037151 A1 | 2/2010 | Ackerman et al. |
| 2012/0011451 A1 | 1/2012 | Bansal et al. |
| 2012/0166534 A1 | 6/2012 | Bentley et al. |
| 2016/0173823 A1 | 6/2016 | Duckworth et al. |
| 2018/0176508 A1 | 6/2018 | Pell |
| 2019/0088153 A1 | 3/2019 | Bader-natal et al. |
| 2020/0186375 A1 | 6/2020 | Faulkner |

OTHER PUBLICATIONS

"Welcome to the Microsoft Teams UserVoice!", Retrieved from https://microsoftteams.uservoice.com/forums/555103-public/suggestions/39755410-use-multiple-monitors-in-team-calls-split-content, Feb. 20, 2020, 4 Pages.

"International Search Report and Written Opinion Issued in PCT Application No. PCT/US2021/053080", dated Jan. 21, 2022, 16 Pages.

* cited by examiner

Single Display Device

UI TRANSITIONS TO ARRANGEMENT BASED ON TEAM GROUPINGS

UI TRANSITIONS TO ARRANGEMENT BASED ON GEOGRAPHIC GROUPINGS

DYNAMIC GROUPING OF LIVE VIDEO STREAMS AND CONTENT VIEWS

BACKGROUND

There are a number of communication systems that allow users to collaborate. For example, some systems allow people to collaborate by the use of live video streams, live audio streams, and other forms of text-based or image-based mediums. Participants of a communication session can share a video stream showing a single person or a group of people with a display of shared content. Such systems can provide participants of a communication session with an experience that simulates an in-person meeting.

Although there area number of systems that allow users to collaborate and share content, such systems still have a number of shortcomings. For instance, some user interface arrangements and hardware configurations may not optimally promote user engagement during live video conferences. This may occur when a system generates a user interface showing multiple live video streams that are arranged based on an order in which the users join the meeting. Such user interface arrangements make it difficult for users to readily identify people and related content of interest. For instance, in a meeting involving a number of company teams, a user may have a difficult time identifying team members if the arrangement of video streams is based on based on an order in which people joined the meeting.

Computing systems that do not promote user engagement can lead to production loss and inefficiencies with respect to a number computing resources. For instance, participants of a communication session, such as an online meeting, may need to refer to recordings or other resources when live content is missed or overlooked. Content may need to be re-sent when viewers miss salient points or cues during a live meeting. Viewers may also have to re-watch content when they miss salient points or cues during a viewing of a recorded presentation. Such activities can lead to inefficient use a network, processor, memory, or other computing resources. Also, a loss in a participant's level of engagement during a meeting may cause a need for prolonged meetings or follow-up meetings, which in turn take additional computing resources. Such inefficiencies can be exacerbated when a system is used to provide a collaborative environment for a large number of participants. More specifically, when meetings have a large number of participants, it can be disengaging for users if the videos streams of the participants are not optimally arranged for specific scenarios.

In addition to a loss in user engagement, a number of resource inefficiencies can result when communication systems do not optimally arrange videos streams of the meeting participants. For example, if a user has a difficult time locating a teammate on an arrangement of participant streams, that user can miss important social cues, e.g., when a person raises their hand, begins to speak, looks in a certain direction, etc. When such social cues are missed, this can cause a need for users to manually interact with a number of different systems. For example, users who miss important cues or gestures may start to utilize additional computing resources to communicate using text messages, emails, or other forms of communication. Such manual steps can be disruptive to a person's workflow and highly inefficient when it comes to helping a person establish a collaboration protocol with a group of people. Such drawbacks of existing systems can lead to loss of productivity as well as inefficient and duplicative use of computing resources.

SUMMARY

The disclosed techniques optimize the use of computing resources and user engagement by dynamically displaying a group of users and content shared in a communication session within a designated display area where each user of the group each share a common activity factor. For example, participants can be part of a group displayed in a certain section of a user interface or on a particular display screen if they each share a location, a role, a set of permissions, a team, a contribution level, etc. A system can also allow users of a group to exclusively control content that is displayed within a designated display area associated with the group. By dynamically displaying a group of users and content they control within designated display area by the use of a common activity factor, a system can improve user engagement by enabling users to readily identify people and content of interest. The system can also switch between any set of factors to promote user engagement by optimally arranging videos streams of the participants for specific user scenarios.

In one example, a method for execution on a system can include operations for analyzing contextual data defining individual activity factors for individual users each associated with individual video streams of a plurality of video streams, wherein the analysis of the contextual data determines individual user groups having individual users each having a common activity factor. The common activity factor can be based on at least one of a common location, a common role, a common organization team, or a common contribution level. The method can also include operations for generating communication data for causing one or more computing devices to generate one or more user interfaces comprising a first display area and a second display area. The first display area is reserved for renderings of a first set of video streams depicting individual users of a first user group associated with a first activity factor The second display area is reserved for renderings of a second set of video streams depicting individual users of a second user group associated with a second activity factor. The first display area includes a first screen sharing area reserved for a rendering of content controlled by at least one user of the first user group and the second display area includes a second screen sharing area reserved for a rendering of content controlled by at least one user of the second user group.

The system can then cause a transmission of the communication data comprising the plurality of streams to the one or more computing devices, the communication data causing the one or more computing devices to display the one or more user interfaces concurrently displaying the first display area and the second display area, wherein the communication data causes the one or more computing devices to display the renderings of the first set of video streams depicting individual users associated with a first activity factor and the rendering of content in the first screen sharing area that is controlled by the at least one user of the first user group within the first display area. The communication data causes the one or more computing devices to display the renderings of the second set of video streams depicting individual users associated with the second activity factor within the second display area and the rendering of content in the second screen sharing area that is controlled by the at least one user of the second user group, wherein the first content and the second content are concurrently displayed.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
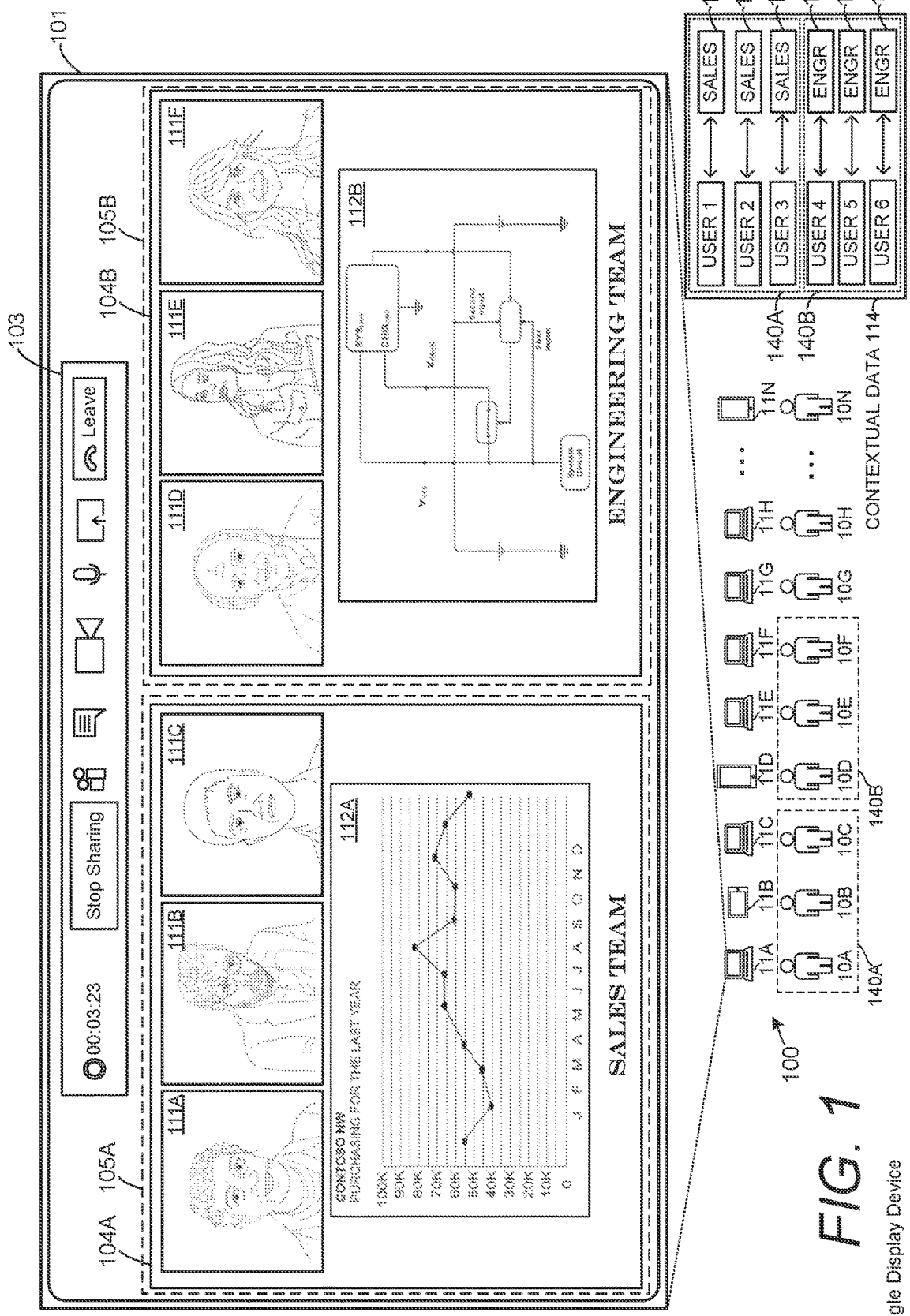
FIG. 1 illustrates a user interface that shows two groups of users that are displayed on a single display device, where the groups are created based on a first factor, where content displayed with each group is controlled exclusively by users of each group.

The techniques disclosed herein provide systems with a way to efficiently optimize the use of computing resources and user engagement by dynamically displaying a group of users of a communication session within a designated display area where each user of the group each share a common activity factor. Technical problems encountered during communication sessions include limited, standardized techniques of organizing user interface arrangements, which can make it difficult for users to readily identify people and related content of interest. User interface arrangements that do not organizing content or representations of users in an organized manner can lead to users missing important information and social cues. When information is missed during a communication session, such as an on-line video meeting where content is shared, users may have to rely on extra steps to obtain any missed information. For instance, participants of a communication session, such as an online meeting, may need to refer to recordings or other resources when live content is missed or overlooked. Content may need to be re-sent when viewers miss salient points or cues during a live meeting. Viewers may also have to re-watch content when they miss salient points or cues during a viewing of a recorded presentation. Such activities can lead to inefficient and/or redundant use of network, processor, memory, or other computing resources. These extra steps may also lead to inadvertent user inputs and other errors, as multiple versions of information may have to be entered, stored, and processed.

Also, systems having standardized user interface arrangements of people and content during communication sessions can also inhibit a participant's level of engagement. This can negatively impact a system's efficiency during a meeting, given that a loss in a participant's level of engagement may cause a need for prolonged meetings or follow-up meetings, which in turn take additional computing resources. Such inefficiencies can be exacerbated when a system is used to provide a collaborative environment for a large number of participants. More specifically, when meetings have a large number of participants, it can be disengaging for users if the videos streams of the participants are not optimally arranged for specific scenarios.

Technical effects achieved include improvements over conventional systems by dynamically displaying a group of users of a communication session within a designated display area where each user of the group each share a common activity factor. Technical effects further include reducing the amount of bandwidth and computational cycles used by computing systems to provide a communication session for users. By dynamically displaying a user group according to an activity factor and displaying content they control within a designated display area, a system can improve user engagement by enabling users to readily identify people and content of interest. The system can also switch between any set of factors to promote user engagement by optimally arranging videos streams of the participants and content for specific user scenarios. This can avoid the need for additional meetings to discuss missed information, emails requesting missed information, a need for a playback of a recording of a meeting, etc. As a result, the disclosed systems and methods can significantly reduce memory, computing cycle, and bandwidth utilization over existing systems.

FIG. 1 shows aspects of a system 100 configured to dynamically display a group of users and/or content of a communication session within a designated display area where each user of the group each share a common activity factor. For example, participants can be part of a group displayed in a certain section of a user interface or on a particular display screen if they each share a location, a role, a set of permissions, a team, a contribution level, etc.

In some embodiments, the system 100 can analyze contextual data 114 defining individual activity factors 150 for individual users 10A-10F each associated with individual video streams of a plurality of video streams. In this example, the individual users 10A-10F correlate to renderings 111A-111F of the plurality of video streams that may be generated from computing devices 11A-11F of the individual users 10A-10F. Other users 10G-10N can also be part of a communication session but may not be included in a rendering unless the contextual data 114 associates a particular user with an activity factor 150. Thus, in this illustrative embodiment, the users 10G-10N that are not associated with an activity factor are not rendered in the user interface.

The analysis of the contextual data 114 can determine individual user groups 140 having individual users each having a common activity factor 150, or also referred to herein as a common "activity." For example, the common activity factor can be based on at least one of a common location, a common role, a common organization team, or a common contribution level. In this illustrative example, the first user 10A through the third user 10C are each associated with a particular team, e.g. a sales team 150A. The fourth user 10D through the sixth user 10F are each associated with another particular team, e.g. an engineering team 150B. These examples are provided for illustrative purposes and are not to be construed as limiting. Each user can be associated with any type of activity, also referred to herein as an activity factor or activity category, and the system can generate any number of display areas to group users having similar or identical activity categories. In some configurations, as explained below, and activity category can be associated with a score and any users having a score within a threshold range can be grouped within a UI arrangement.

In response to the contextual data indicating the activity factors, the system 100 can generate communication data configured to cause one or more computing devices 11A-1F to each generate one or more user interfaces 101 comprising a first display area 105A and a second display area 105B. The first display area 105A is reserved for renderings 111A-111C of a first set of video streams depicting individual users 10A-10C of a first user group 140A associated with a first activity factor 150A. In this example, the users of the first group 140A are all associated with a first activity factor, e.g., each user is part of a sales team. The second display area 105B is reserved for renderings 111D-111F of a second set of video streams depicting individual users 10D-10F of a second user group 140B associated with a second activity factor 150B. In this example, the users of the second group 140B are all associated with a second activity factor, e.g., each user is part of an engineering team. In addition, the first display area 105A includes a first screen sharing area 112A reserved for a rendering of a first content controlled by at least one user of the first user group 140A. In addition, the second display area 105B includes a second screen sharing area 112B reserved for a rendering of a second content controlled by at least one user of the second user group 140B.

In some configurations, the display areas 105 can be predetermined areas within a user interface. The predetermined areas can be in the form of any suitable shape, such as a circle, square, rectangle or any other designated area that is reserved for a particular group of users. In one illustrative example, the display areas can be designated by a window 104 having a designated border, such as the first window 104A and the second window 104B. The display areas 105 can also be positioned on individual display screens, so that each display screen can be reserved for a particular group of users having a common activity factor.

Also shown in FIG. 1, the user interface 101 can include a graphical control panel 103 providing one or more input elements used for controlling aspects of the communication session. The input elements can include a button, e.g., the "stop sharing" button for allowing a user of a particular group to control the display of shared content that is displayed within a screen sharing area 112. For example, a first user 10A that is associated with the first group 140A can use a corresponding device 11A to control the display of content shared within the first display area 112A that is associated with the first group. Another user, such as the fourth user 10D that is associated with the second group 140B can use a corresponding device 11D to control the display of content shared within the second display area 112B that is associated with the second group 140B.

A computing device, which may include any of the client computing devices 11 of FIG. 1 or a server, such as a server or central computing device described herein, can generate and transmit communication data causing the client computing devices 11 to display a user interface 101. For instance, at least one computing device can cause the transmission of communication data comprising the plurality of streams 111 each having image data depicting a user to the one or more computing devices 11A-11F. The communication data causes the one or more computing devices 11A-11F to display the one or more user interfaces 101 concurrently displaying the first display area 105A and the second display area 105B. The communication data causes the one or more computing devices 11A-11F to display the renderings 111A-111C of the first set of video streams depicting individual users 10A-10C associated with a first activity factor 150A and a rendering of the first content in the first screen sharing area 112A that is controlled by the at least one user of the first user group 140A within the first display area 105A.

The communication data causes the one or more computing devices 11A-11F to reserve the first display area 105A for renderings 111A-111C of the first set of video streams depicting individual users 10A-10C associated with a first activity factor 150A. The communication data causes the one or more computing devices 11A-11F to also reserve the first display area 105A for a rendering of the first content in the first screen sharing area 112A that is controlled by the at least one user of the first user group 140A.

The communication data also causes the one or more computing devices 11A-11F to reserve the second display area 105B for renderings 111D-111F of the second set of video streams depicting individual users 10D-10F associated with a second activity factor 150B. The communication data also causes the one or more computing devices 11A-11F to display the renderings 111D-111F of the second set of video streams depicting individual users 10D-10F associated with the second activity factor 150B within the second display area 105B and the rendering of the second content in the second screen sharing area 112B that is controlled by the at least one user of the second user group 140B. In some embodiments, the first content and the second content are concurrently displayed.

Figure 2:
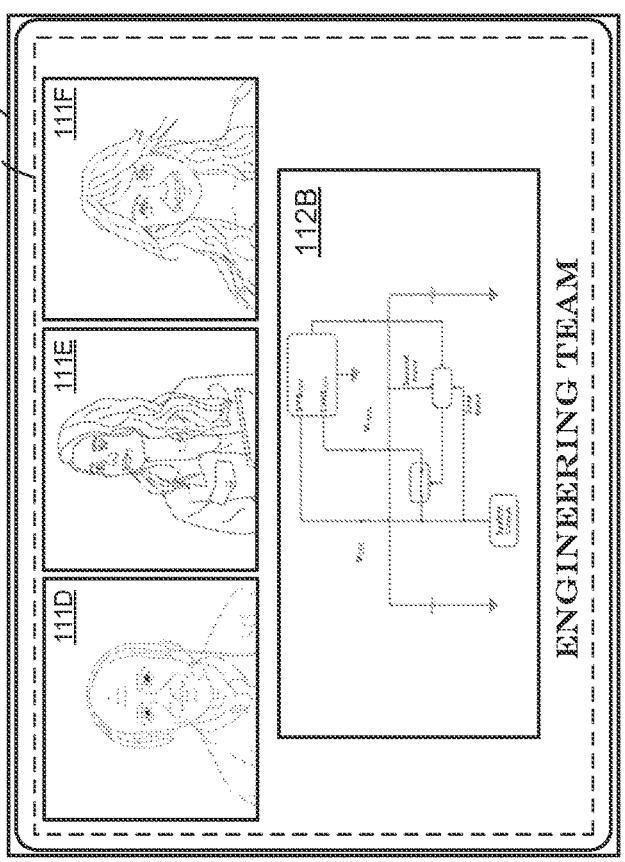
FIG. 2 illustrates a user interface arrangement that shows two groups of users that are displayed on multiple display devices, where the groups are created based on a first factor, where content displayed with each group is controlled exclusively by users of each group.
Figure 2:
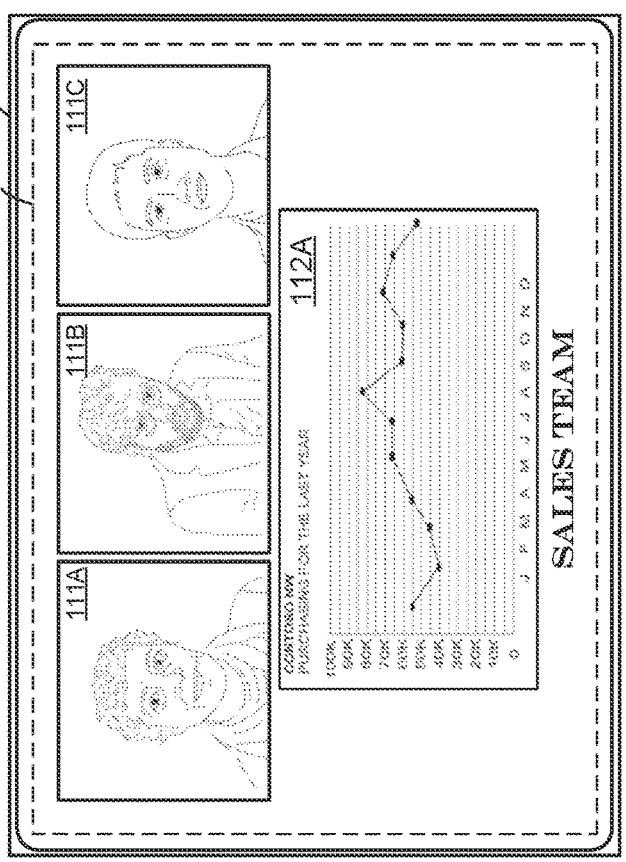
Figure 2:
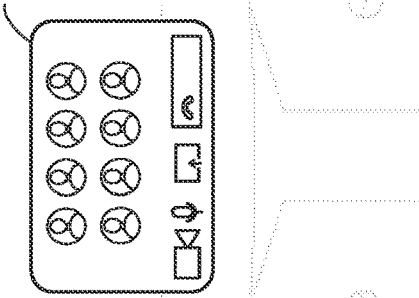

Referring now to FIG. 2, another embodiment that includes display areas 105 that are designated with individual display devices 101 is shown and described below. In this example, a first display area 105A is arranged within a first display screen 101A, and a second display area 105B is arranged within a second display screen 101B. This example is provided for illustrative purposes and is not to be construed as limiting. It can be appreciated that a computing device of a system 100 can communicate with any number of display screens 101 and thus display any number of groups, wherein each display screen 101 is reserved for the display of one or more user groups and content of corresponding groups.

In this embodiment, a computing device can be in communication with a first display screen 101A and a second display screen 101B. The first display screen 101A can be reserved for renderings 111A-111C of a first set of video streams depicting individual users 10A-10C associated with a first activity factor 150A. The first display screen 101A can also be reserved for first content in the first screen sharing area 112A that is controlled by the at least one user of the first user group 140A. The second display screen 101B can be reserved for renderings 111D-111F of a second set of video streams depicting individual users 10D-10F associated with a second activity factor 150B. The second display screen 101B can also be reserved for second content in the second screen sharing area 112B that is controlled by the at least one user of the second user group 140B. In some embodiments, the first content and the second content are concurrently displayed.

In this embodiment, a third display screen 101C can also be configured to display one or more input elements used for controlling aspects of the communication session. The input elements can include one or more buttons for allowing a user of a particular group to control the display of shared content that is displayed within a screen sharing area 112 that is controlled by their group. For example, with reference to the groups shown in FIG. 1, a first user 10A that is associated with the first group 140A can use a corresponding device 11A to control the display of content shared within the first display area 112A that is associated with the first group. Another user, such as the fourth user 10D that is associated with the second group 140B can use a corresponding device ID to control the display of content shared within the second display area 112B that is associated with the second group 140B.

Figure 3A:
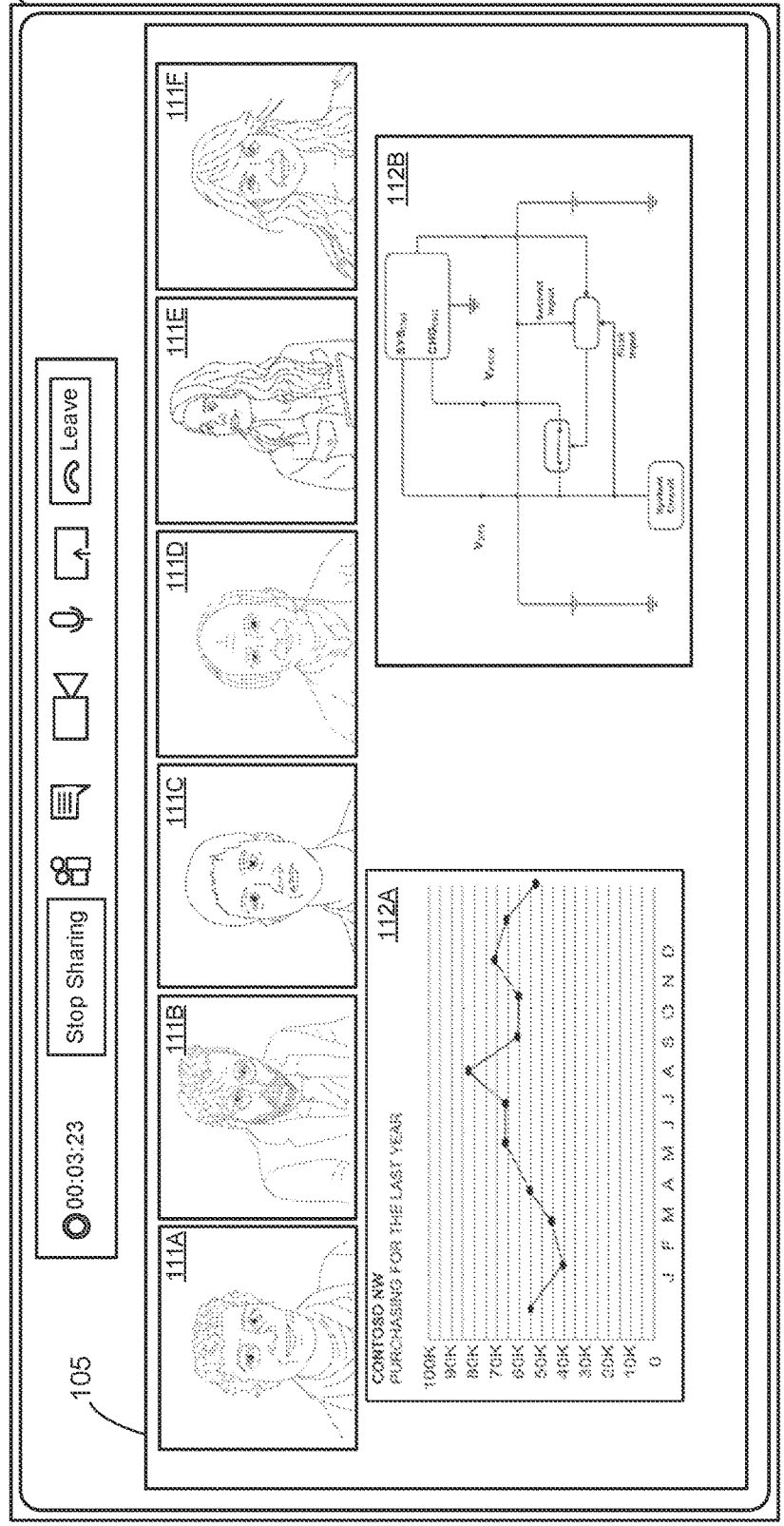
FIG. 3A illustrates a stage of a transition to a user interface arrangement of that shows a number of users that are displayed on a single display device, where content displayed with the users is controlled exclusively by users of individual groups of people.
Figure 3B:
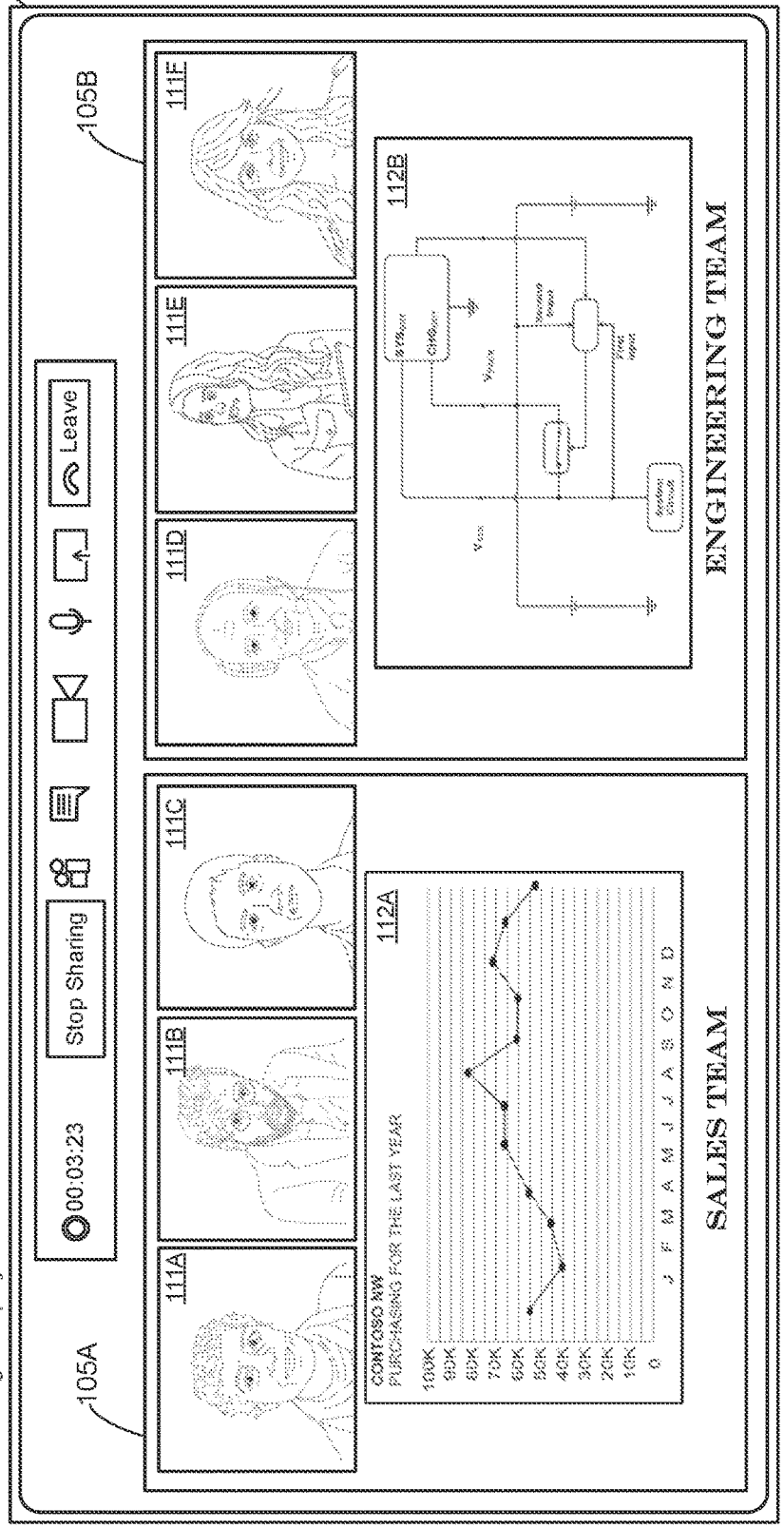
FIG. 3B illustrates a stage of a transition to a user interface arrangement of that shows two groups that are created from the number of users of FIG. 2, where the groups are each displayed in individual sections of a display screen based on a first factor, where content displayed with each group is controlled exclusively by users of an associated group.
Figure 3B:
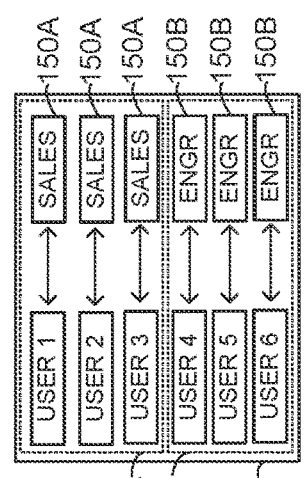
Figure 3B:
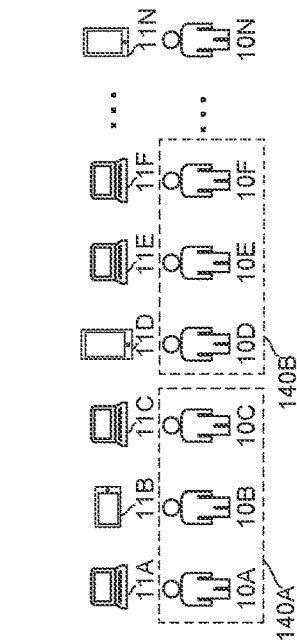
Figure 3C:
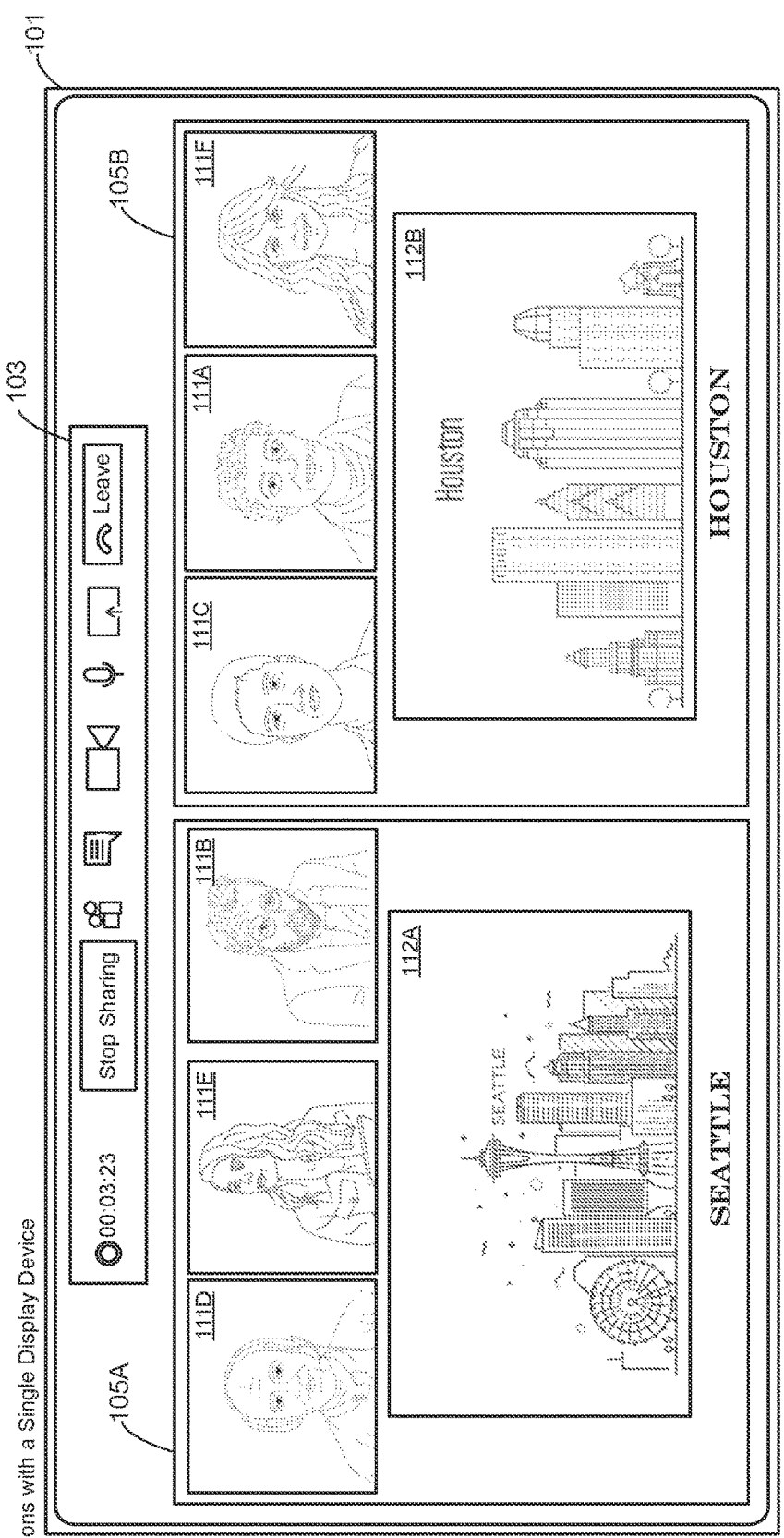
FIG. 3C illustrates a stage of a transition to a user interface arrangement of that shows two groups that are created from the number of users of FIG. 2 or from the groups of FIG. 3, where the groups are each displayed in individual sections of a display screen based on a second factor, where content displayed with each group is controlled exclusively by users of an associated group.
Figure 3C:
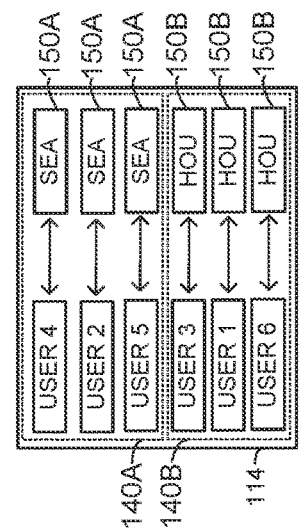
Figure 3C:
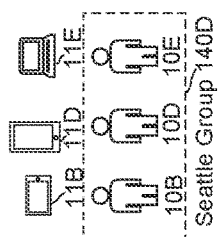
Figure 3C:
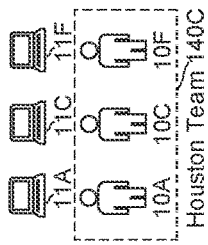

FIGS. 3A-3C illustrate an example of several user interface transitions that can occur in response to user selections of various activity factors. For example, FIG. 3A illustrates a user interface 101 that includes a single display area 105 for displaying a number renderings 111A-111F and shared content within one or more screen sharing areas 112A-112B. In response to a user selection of a particular activity factor, e.g., a corporate team, the system can cause a transition from the first user interface arrangement of FIG. 3A to a second user interface arrangement of FIG. 3B, e.g., a user interface arrangement having user groups that are based on team membership. In another example, in response to a user selection of another activity factor, e.g., a location, the system can cause a transition from the first user interface arrangement of FIG. 3A, or from the second user interface arrangement of FIG. 3B, to a third user interface arrangement of FIG. 3C, e.g., a user interface arrangement having user groups that are based on each user's location. In this embodiment, one or more display devices, such as a third display device 101C, can also be reserved for providing controls managing shared content.

In one example, the user interface arrangement of FIG. 3A can be configured with a single display area 105 having renderings that are ordered according to an activity factor. For example, renderings of individuals can be grouped, and each group can be ordered, e.g., ordered from left to right the ordering can include the first group, the second group, etc. Thus, renderings 111A-111C can be first, 111D-111F can be second, etc. In addition, content shared by each group can be aligned with renderings of associated individuals. In this example, the first content displayed in the first screen sharing area 112A can be vertically aligned with renderings 111A-111C of the users of the first group. The second content displayed in the second screen sharing area 112B can be vertically aligned with renderings 111D-111F of the users of the first group. This example is provided for illustrative purposes and is not to be construed as limiting. They can be appreciated that the user interface arrangement of FIG. 3A can include renderings that are ordered based on other factors.

FIG. 3B illustrates a user interface arrangement that includes a first group of users 140A and their shared content is displayed on the first display device 101A, and a second group of users 140B and their shared content is displayed on the second display device 101B. Users for each group share a common activity factor, e.g., each member of a group is a member of the same team. The user interface 101 comprising a first display area 105A and a second display area 105B. The first display area 105A is reserved for renderings 111A-111C of a first set of video streams depicting individual users 10A-10C of a first user group 140A associated with a first activity factor 150A. In this example, the users of the first group 140A are all associated with a first activity factor, e.g., each user is part of a sales team. The second display area 105B is reserved for renderings 111D-111F of a second set of video streams depicting individual users 10D-10F of a second user group 140B associated with a second activity factor 150B. In this example, the users of the second group 140B are all associated with a second activity factor, e.g., each user is part of an engineering team. In addition, the first display area 105A includes a first screen sharing area 112A reserved for a rendering of a first content controlled by at least one user of the first user group 140A. In addition, the second display area 105B includes a second screen sharing area 112B reserved for a rendering of a second content controlled by at least one user of the second user group 140B.

As shown in FIG. 3C, based on contextual data 114, the users of the first group 140A are all associated with a first activity factor, e.g., each user is located within, or associated with, a Seattle office. The first display area 105A is reserved for renderings 111B, 111D and 111E of a first set of video streams depicting individual users 10B, 10D, and 10E of a first user group 140A associated with a first activity factor 150A. In addition, the first display area 105A includes a first screen sharing area 112A reserved for a rendering of a first content controlled by at least one user of the first user group 140A. The users of the second user group 140B are all associated with a second activity factor, e.g., each user is located within, or associated with, a Houston office. The second display area 105B is reserved for renderings 111A, 111C and 111F of a second set of video streams depicting individual users 10A, 10C, and 10F of the second user group 140B associated with a second activity factor 150B. The second display area 105B also includes a second screen sharing area 112B reserved for a rendering of a second content controlled by at least one user of the second user group 140B.

Figure 4A:
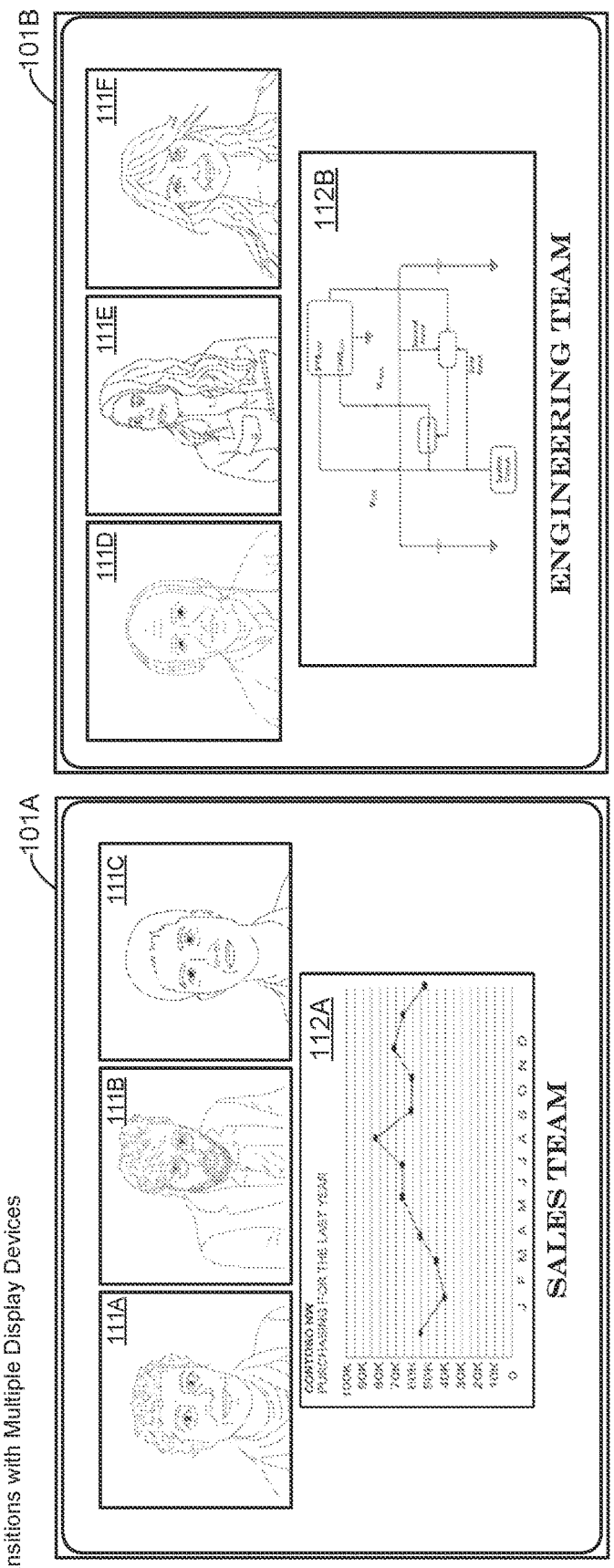
FIG. 4A illustrates a stage of a transition to a user interface arrangement of that shows two groups of users, where the groups are displayed on separate display devices based on a first factor, where content displayed with each group is controlled exclusively by users of an associated group.
Figure 4A:
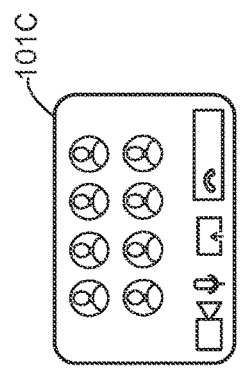
Figure 4B:
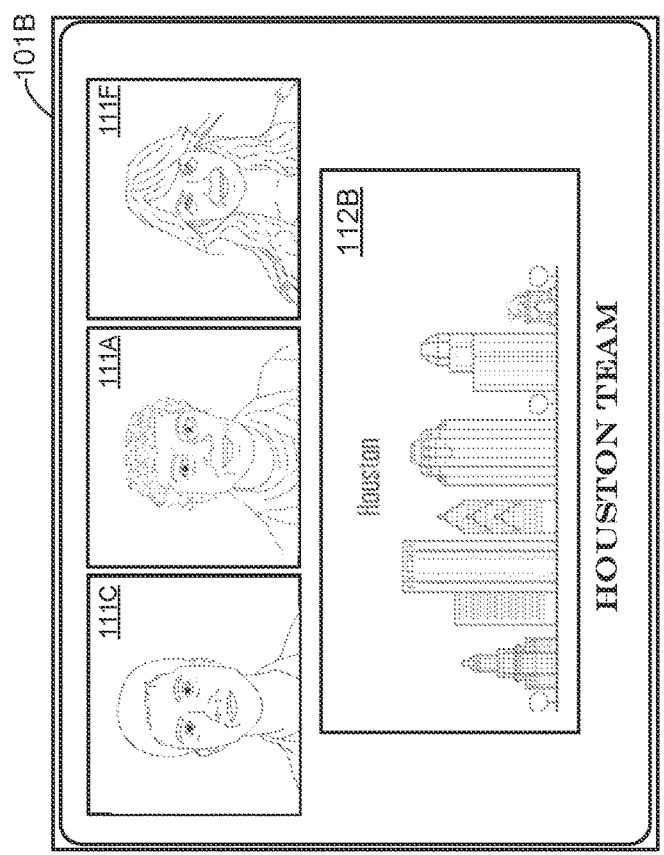
FIG. 4B illustrates a stage of a transition to a user interface arrangement of that shows two groups of users, where the groups are displayed on separate display devices based on a second factor, where content displayed with each group is controlled exclusively by users of an associated group.
Figure 4B:
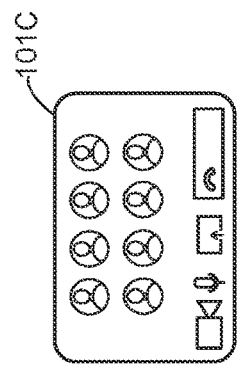
Figure 4B:
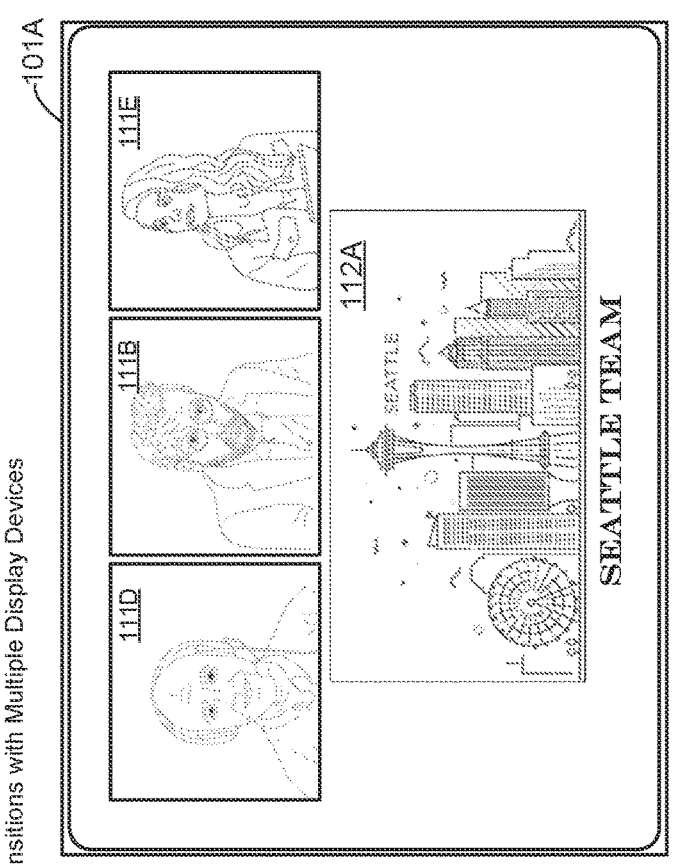

FIGS. 4A-4B illustrate an example of another user interface transition that can occur in response to a selection of a particular activity factor. For example, FIG. 4A illustrates a user interface arrangement that includes a first group of users 140A and their shared content is displayed on the first display device 101A, and a second group of users 140B and their shared content is displayed on the second display device 101B. In some embodiments, the first display device 101A is reserved for renderings of the first user group 140A and the second display device 101B is reserved for renderings of the second user group 140B. In the example of FIG. 4A, users for each group share a common activity factor, e.g., each member of a group is a member of the same team. In addition, the first display device 10A includes a screen sharing area 112A reserved for a rendering of a first content controlled by at least one user of the first user group 140A.

In response to a user selection of another activity factor, e.g., a location, the system can cause a transition from the user interface arrangement of FIG. 4A to another user interface arrangement of FIG. 4B, e.g., a user interface arrangement having user groups that are based on a location of each user. The first display area 105A includes a first screen sharing area 112A reserved for a rendering of a first content controlled by at least one user of the second user group 140A. In addition, the second display area 105B includes a second screen sharing area 112B reserved for a rendering of a second content controlled by at least one user of the second user group 140B.

Figure 5A:
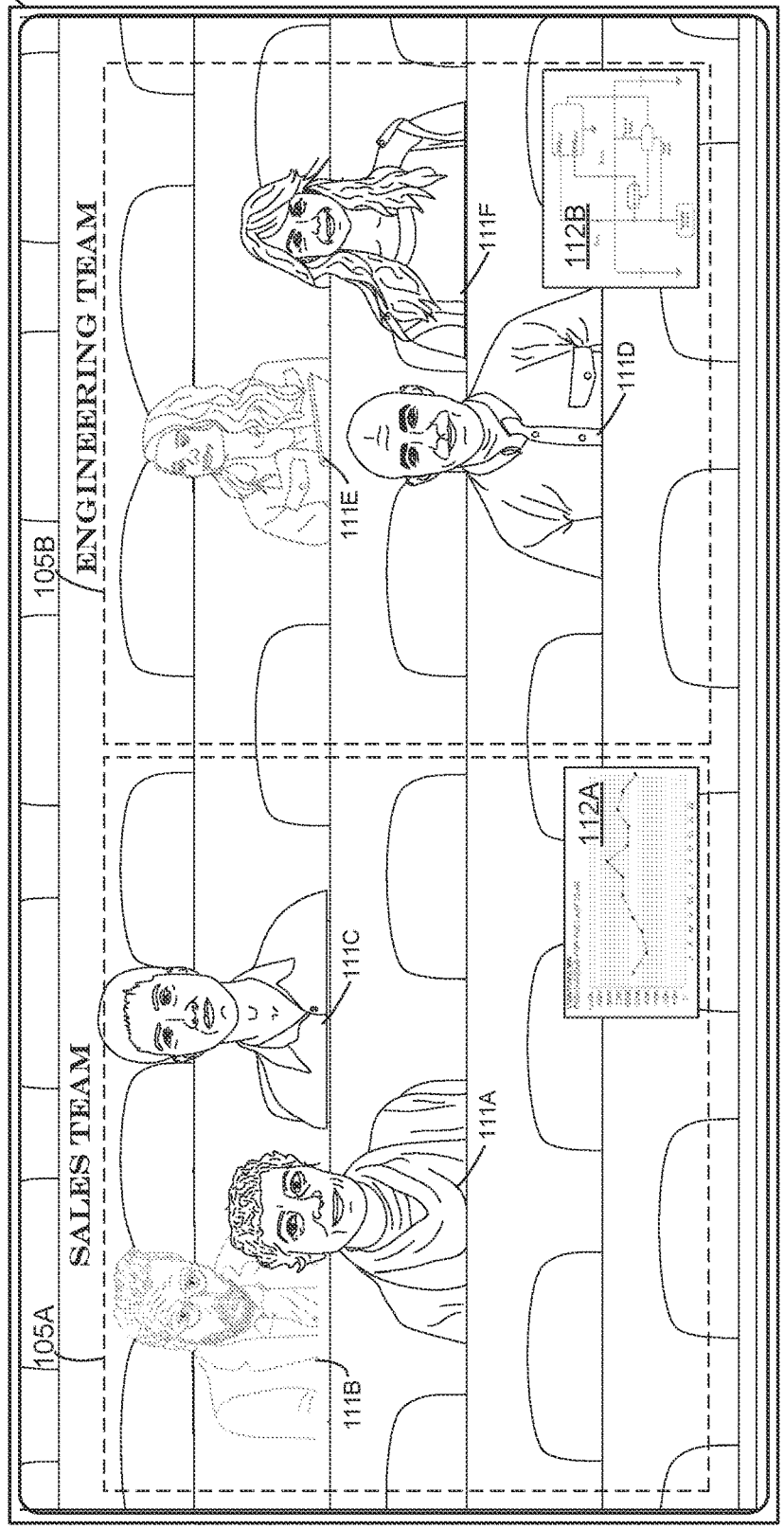
FIG. 5A illustrates a stage of a transition to a user interface arrangement of that shows two groups of users, where the groups are displayed within a Together Mode arrangement based on a first factor, where content displayed with each group is controlled exclusively by users of an associated group.
Figure 5B:
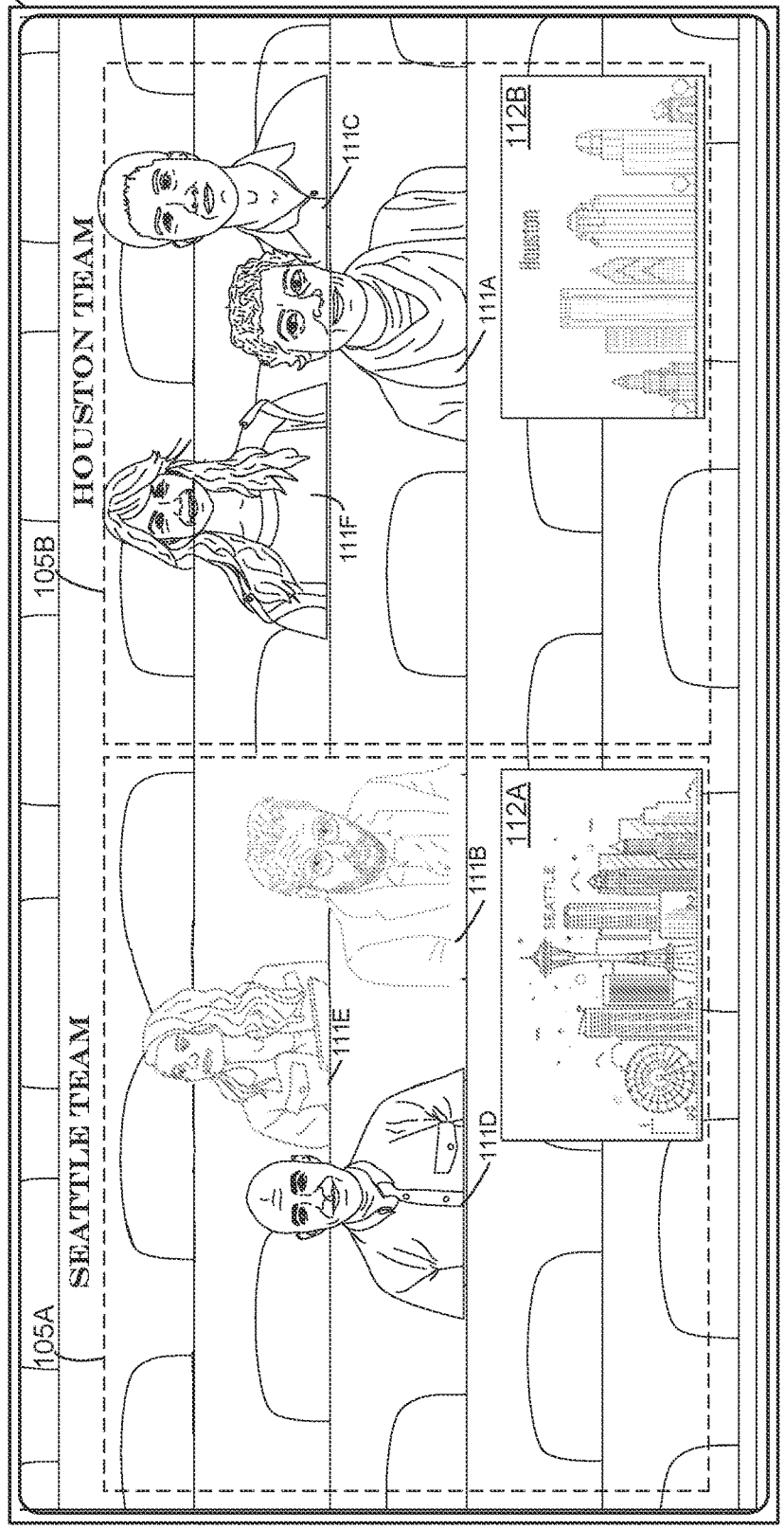
FIG. 5B illustrates a stage of a transition to a user interface arrangement of that shows two groups of users, where the groups are displayed within a Together Mode arrangement based on a second factor, where content displayed with each group is controlled exclusively by users of an associated group.

FIGS. 5A-5B illustrate an example of several user interface transitions for a Together Mode user interface. For example, FIG. 5A illustrates a user interface 101 that includes multiple display areas 105 that are overlaid on a Together Mode user interface. In some configurations, the Together Mode user interface comprises a plurality of individual renderings 111 of users participating in a communication session. Each rendering 111 is processed to only include the image of a person, an image that is produced by filtering any light produced by background objects behind each user. Thus, each rendering is trimmed to the shape, or outline, of each user. In addition, in some embodiments, each rendering can have a normalized light level such that each rendering has a level within a predetermined range. Each rendering 111 can also be arranged within, or overlaid on, a virtual environment having a seating arrangement. The virtual environment can also include other objects such as desks, walls, or any other object or set of objects that represents a room or meeting forum. The virtual environment can be a two-dimensional environment or a three-dimensional environment. In the example of FIGS. 5A-5B, the virtual environment is a two-dimensional environment having a number of seats and each rendering is sized and positioned to give the appearance that each user is sitting in the seats of the virtual environment.

In the example of FIG. 5A, the user interface 101 also includes a first display area 105A and a second display area 105B. The first display area 105A is reserved for renderings 111A-111C of a first set of video streams depicting individual users 10A-10C of a first user group 140A associated with a first activity factor 150A. In this example, the users of the first group 140A are all associated with a first activity factor, e.g., each user is part of a sales team. The second display area 105B is reserved for renderings 111D-111F of a second set of video streams depicting individual users 10D-10F of a second user group 140B associated with a second activity factor 150B. In this example, the users of the second group 140B are all associated with a second activity factor, e.g., each user is part of an engineering team. In addition, the first display area 105A includes a first screen sharing area 112A reserved for a rendering of a first content controlled by at least one user of the first user group 140A. In addition, the second display area 105B includes a second screen sharing area 112B reserved for a rendering of a second content controlled by at least one user of the second user group 140B. For illustrative purposes, display areas that are reserved for a particular set of renderings also means that such display areas are exclusively reserved for that particular set of renderings, and thus other renderings are restricted from such display areas.

In response to a user selection of another activity factor, e.g., a location for each user, the system can cause a transition from the user interface arrangement of FIG. 5A to another user interface arrangement of FIG. 5B, e.g., a user interface arrangement having user groups that are based on a location of each user. The transition may be caused by a selection of a new activity factor. For example, a first selection of a team-based factor can cause the display of the user interface arrangement of FIG. 5A. Then, a selection of a second factor, such as a location-based factor, can cause the display of the user interface arrangement of FIG. 5B. In this example, the user interface arrangement of FIG. 5B having user groups that are based on a location, which can be provided by contextual data 114 indicating user associations with a location. The association can be based on actual locations of each individual, e.g., by GPS location data, or contact information indicating a location of an office or home.

As shown in FIG. 5B, based on contextual data, such as the contextual data 114 of FIG. 3C, the users of the first group 140A are all associated with a first activity factor, e.g., each user is located within, or associated with, a Seattle office. The first display area 105A is reserved for renderings 111B, 111D and 111E of a first set of video streams depicting individual users 10B, 10D, and 10E of a first user group 140A associated with a first activity factor 150A. In addition, the first display area 105A includes a first screen sharing area 112A reserved for a rendering of a first content controlled by at least one user of the first user group 140A.

The users of the second user group 140B are all associated with a second activity factor, e.g., each user is located within, or associated with, a Houston office. The second display area 105B is reserved for renderings 111A, 111C and 111F of a second set of video streams depicting individual users 10A, 10C, and 10F of the second user group 140B associated with a second activity factor 150B. The second display area 105B also includes a second screen sharing area 112B reserved for a rendering of a second content controlled by at least one user of the second user group 140B.

Figure 6:
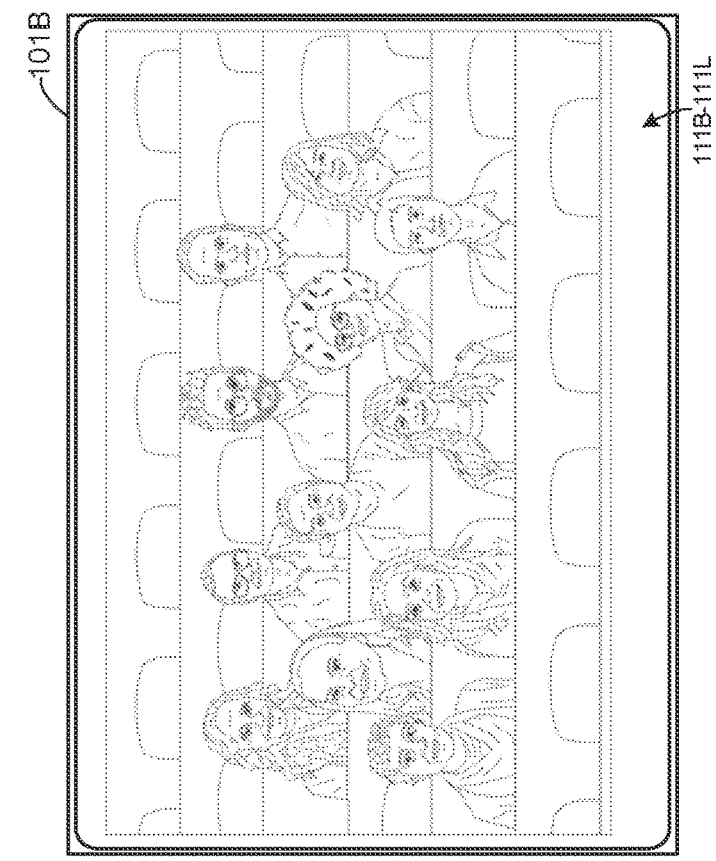
FIG. 6 illustrates a user interface arrangement that shows two groups of users that are displayed on multiple display devices, where the groups are created based on roles of the users, where content displayed with each group is controlled exclusively by users of each group.
Figure 6:
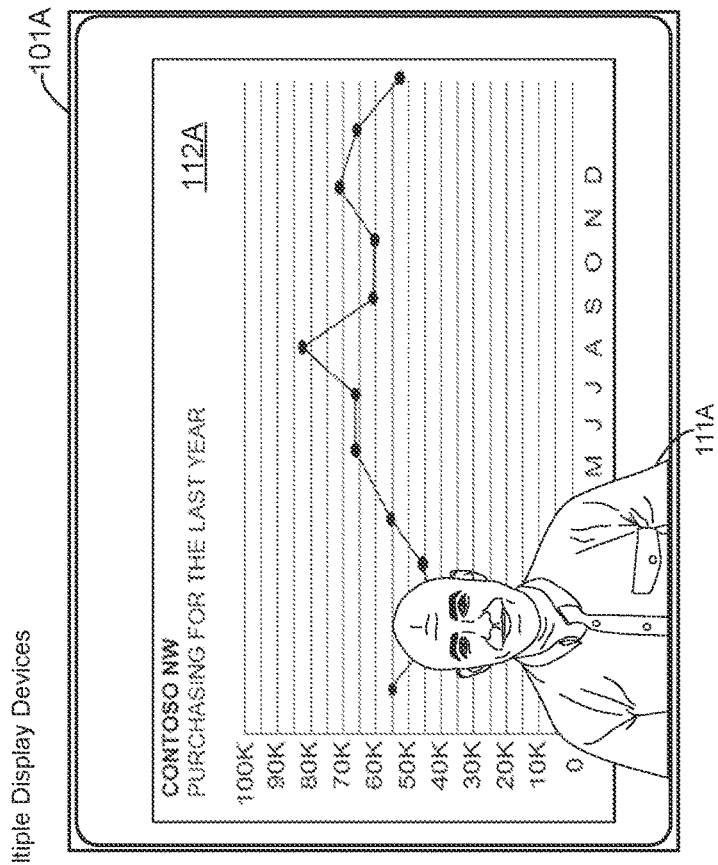

In addition to factors such as associations with teams and locations, the system can utilize other factors such as roles or titles within an organization. FIG. 6 shows one example of a user interface arrangement where display devices 101 are reserved for renderings of users having particular roles. As shown, the first display device 101A is reserved for a first rendering 111A of a first user based on a role associated with the first user, e.g., that the first user is a presenter. In this example, other participants of the communication session have renderings 111B-111L that are each positioned within a second display screen 111B that is reserved for users associated with a second role, e.g., a role as audience members. This example, the user having a presenter will also have exclusive control over a display of content in a content sharing area 112A while the system restricts the others users from controlling any file or media displayed on the content sharing area 112A.

In some configurations, backgrounds and user interface arrangements can be auto assigned to each group and/or each display area based on roles, teams, location, or other activity type. For example, with reference to FIG. 6, the virtual environment displayed on the right display device 101B can be configured with a particular lighting configuration, e.g., lighting arrangement or lighting colors, that are consistent with the activity factor of the displayed group. For instance, a particular team or a specific location, e.g., a Seattle office, may be associated with particular colors. In such scenarios, the background of a virtual environment made display those colors. In another example, shapes or certain objects may be associated with a location or team. For instance, the seating arrangement in the virtual environment or some type of architecture may be indicative of a particular team or an office within a city. In such scenarios, the background of the virtual environment may include those characteristics. Thus, in addition to separating groups within a user interface, the system may display characteristics of the team or the activity to provide a graphical representation that enables users to immediately identify a team or a particular group.

Figure 7A:
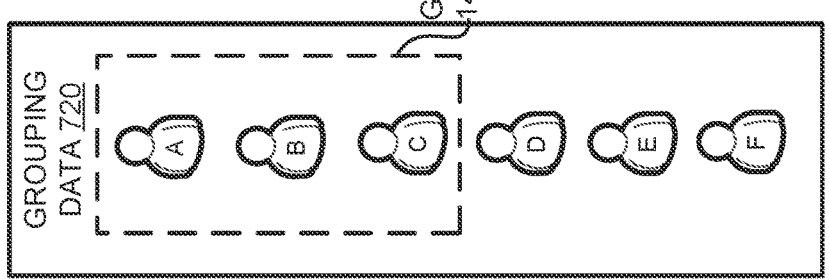
FIG. 7A illustrates a first example of a group of users that is determined based on a first set of factors.
Figure 7B:
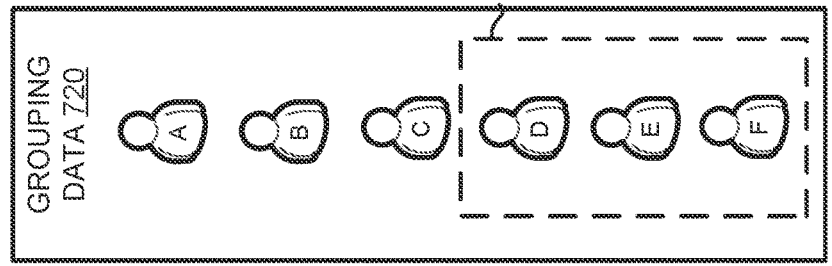
FIG. 7B illustrates a second example of a group of users that is determined based on a second set of factors.

In some configurations, the user groups can be determined by a combination of activity factors. As shown in FIGS. 7A-7B, a system can utilize criteria defined in a policy 701 to associate users of the communication session with display areas that are reserved for particular user groups. For example, as shown in FIG. 7A, a grouping policy can define scores for a number of factors such as, but not limited to, a location 402A, team 402B, content 402C, editing activity 402D, timed activity 402E, and/or gesture activity 402F. A location score associated with a user can indicate a likelihood that the user is at a particular location. For instance, location data, from a GPS system, can indicate that a person is located near a location at a distance from the location can influence the location score, e.g., the score can increase as the user moves closer to the location or decrease as the user moves away from the location. The location score can also indicate a level of accuracy or a reliability level for data indicating a location. For instance, a system can increase a location score if an address book indicates that a user is associated with a particular office. However, if the reliability of the source is low, e.g., the system relies on the content of text messages to identify a location of the user, the location score can be decreased. Similarly, the team score 402B can be based on a level of reliability of the source indicating an association between the user and team. The team score can be increased if the system relies on address book information, or the team score can be decreased if the system relies on an interpretation of messages, emails, etc.

The content score 402C can be based on a level of contribution to selected content. For instance, the system can measure the number of words or an amount of data users contribute to a document. Thus, users providing fewer contributions to a document may receive a lower score than users providing more contributions to the document. The editing activity score 402D can indicate how often a user contributes to content. Thus, a user that edits document 100 times a day may receive a higher editing activity score than a user that only edits the document 10 times a day. A score indicating timed activity 402E may be based on a duration in which a user is interacting with the document or a computer system. Thus, a user interacting with the document for 10 hours may receive a higher editing activity score that a user interacting with the document for only 1 hour. The gesture activity score 402F may be based on any suitable quantity of activity. This may include, but is not limited to, physical movement detected by a camera, a speaking rate detected by a microphone, a volume detected by a microphone, a number of predetermined keywords used in a speech, etc.

Figure 8:
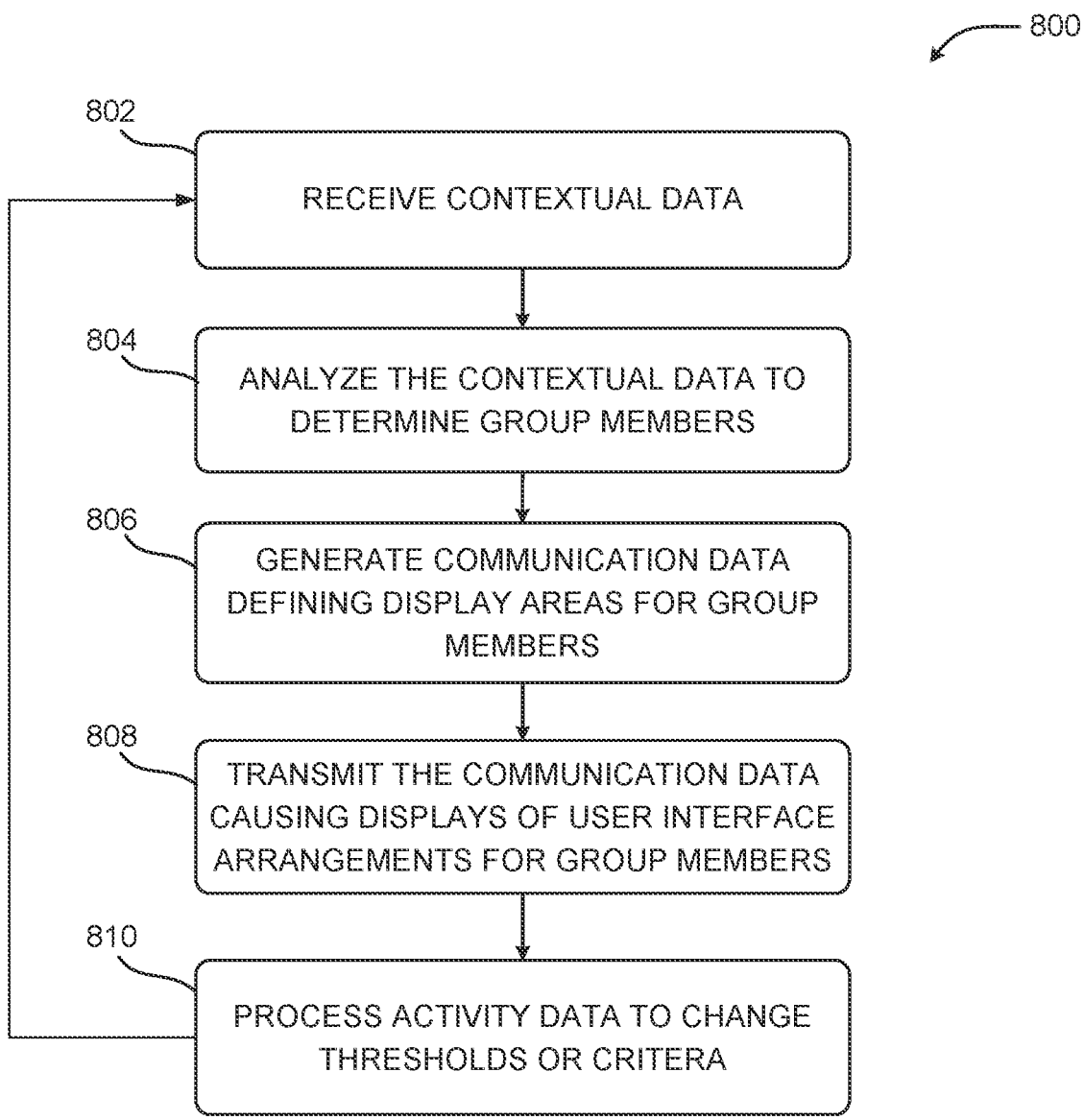
FIG. 8 is a flow diagram illustrating aspects of a sample routine for implementing the techniques disclosed herein.

FIG. 8 is a diagram illustrating aspects of a routine 800 for computationally efficient management of the techniques disclosed herein. It should be understood by those of ordinary skill in the art that the operations of the methods disclosed herein are not necessarily presented in any particular order and that performance of some or all of the operations in an alternative orders is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented 1 as a sequence of computer implemented acts or program modules running on a computing system such as those described herein and/or 2 as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 8 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 800 includes operation 802 where the system receives contextual data, which can include policy data, input data, organizational data, and other data described herein. The policy data, also referred to herein as a grouping policy, that identifies activity factors, and other criteria for selecting users for group based on the activity factors.

Next, at operation 804, the system can analyze contextual data 114 defining individual activity factors 150 for individual users 10A-10F each associated with individual video streams of a plurality of video streams 634. The analysis of the contextual data 114 determines individual user groups 140 having individual users each having a common activity factor 150, wherein the common activity factor can be based on at least one of a common location, a common role, a common organization team, or a common contribution level. These examples are provided for illustrative purposes and are to be construed as limiting. It can be appreciated that operation 804 can consider any type of activity or any other characteristic or attribute of a person to determine if that person should be associated with another person to form a group. As described herein, any single activity factor or any combination of activity factors, attributes or characteristics can be evaluated to determine if two or more people should be part of a group.

Next, at operation 806, the system can generate communication data (639 of FIG. 9) that is configured to cause one or more computing devices 11A-11F to generate one or more user interfaces 101 comprising a first display area 105A and a second display area 105B. The communication data can cause a computer to reserve the first display area 105A for renderings 111A-111C of a first set of video streams 634 depicting individual users 10A-10C of a first user group 140A associated with a first activity factor 150A. The communication data can cause a computer to reserve the second display area 105B for renderings 111D-111F of a second set of video streams 634 depicting individual users 10D-10F of a second user group 140B associated with a second activity factor 150B. The communication data can occur at a server computer such as the system 602 or any other client device when generated by a client device, the communication data can be communicated from one client to each client of a communication session.

The communication data can cause a computer, such as the client computers, to have a first screen sharing area 112A within the first display area 105A and reserve the first screen sharing area 112A for a first content, such as file content or video content, controlled by at least one user of the first user group 140A. For instance, users of a first group can cause the first content to be displayed or modified within the first screen sharing area 112A, but the system will restrict other users from controlling the second content displayed in the second screen sharing area 112B. The communication data can cause a computer to have a second screen sharing area 112B within the second display area 105B and reserve the second screen sharing area 112B for a second content controlled by at least one user of the second user group 140B. For instance, users of the second group can cause the second content to be displayed or modified within the second screen sharing area 112B, but the system can restrict other users from controlling the content displayed in the second screen sharing area 112B.

Next, at operation 808, the system can commit the communication data to the one or more computing devices 11A-11F. The communication data can also include a plurality of streams 111 including image data depicting participants of the communication session. The communication data 639 can cause the one or more computing devices 11A-11F to display the one or more user interfaces 101 concurrently displaying the first display area 105A and the second display area 105B. The communication data 639 can cause the one or more computing devices 11A-11F to display the renderings 111A-111C of the first set of video streams 634 depicting individual users 10A-10C associated with a first activity factor 150A and the rendering of the first content in the first screen sharing area 112A that is controlled by the at least one user of the first user group 140A within the first display area 105A. The communication data 639 can also cause the one or more computing devices 11A-11F to display the renderings 111D-111F of the second set of video streams 634 depicting individual users 10D-10F associated with the second activity factor 150B within the second display area 105B and the rendering of the second content in the second screen sharing area 112B that is controlled by the at least one user of the second user group 140B. The communication data can also cause the computing devices to display the first content and the second content are concurrently displayed.

Next, at operation 808, the system can process any type of activity data to adjust any type of criteria and/or thresholds to be used in future iterations of the routine 800. In some configurations, operation 808 can communicate any type of activity data to a machine learning service for adjusting the criteria and/or thresholds of the routine to optimize how users are selected for a grouping. For instance, if a particular group of users is selected based on a threshold and a user provides an input to reduce the number of users of a group, the system can modify the threshold such that future iterations of the routine can reduce the size of the group. In another example, the system can monitor messages and/or other types of communication to determine if a group sizes too large or too small. Based on this analysis, the system can modify a threshold, such as the threshold defined in the grouping policy, to influence the system to produce larger or smaller groups in future iterations of the routine 800. In another example, the system may analyze a level of activity of participants of a group. If a participant's level of activity is below an activity threshold, the system may modify a threshold to reduce the number of users assigned to a group in future iterations of the routine. In addition to adjusting thresholds, the system may modify a policy and/or criteria to increase or decrease the number of users in future iterations of the routine. As shown, the routine 800 can return to operation 802 to repeat the routine using the any adjusted thresholds, criteria, etc.

In some configurations, the routine 800 can also include a process for transitioning a first user interface arrangement to a second user interface arrangement. This may occur when the contextual data received at operation 802 includes a selection of an activity factor. The selection of the activity factor can indicate a change from a previous activity factor thus causing the system, at operations 804, 806, and 808 to transition from one user interface arrangement having a grouping based on the first activity factor to a second user interface arrangement having a grouping based on a second activity factor.

In some configurations, the routine 800 can also enable a system to support a user interface arrangement that is based on a primary activity factor and a secondary activity factor. Princes, with respect to FIG. 3C, the system can use a primary activity factor such as a location to arrange the users within graphically arranged groups. In addition, a secondary factor may be based on teams, thus, within a particular display area, such as the first display area 105A, is displayed within the area may be ordered based on a team that is associated with each user. In this specific example, the fourth and fifth user, renderings 111D and 111E, who are members of the engineering team, can be positioned before the second user, rendering 111B, who is a member of the sales team. The system can also display a border between the two subgroups within the main group, e.g., a line between the second rendering 111B and the subgroup of renderings 111D and 111E.

Operation 804, the system can utilize scores for different factors to determine one or more users of the group. Scores can be assigned to various activities such as a contribution level to a document or other shared content. Such embodiments can distinguish different users, e.g., the system can differentiate a presenter who is editing a document versus audience members who do not contribute to shared content. In addition, by the use of various scores for different types of activity factors, the system can utilize and weight different types of activity factors to select users for a group.

In the embodiments disclosed herein, the system can transmit communication data to a number of different devices so that each device has the same user interface arrangement at any given time. However, in some configurations, the system can also display different arrangements to different users based on one or factors. For instance, in the example shown in FIG. 6, users having a particular role, such as a presenter, may see an arrangement where a first display area showing the presenter may be smaller than a second display area showing the audience. In addition, the audience members may see an arrangement where the first display area showing the presenter may be larger than a second display area showing the audience.

In some configurations, the weighting of any combination of factors can increase when shared content indicates an increased priority for a particular factor. For instance, if a shared word file or a chat message indicates via text, keywords, or by any other data that editing time of the content is a higher priority, the system will increase the weight of that factor, e.g., an editing time factor such as shown in FIGS. 7A-7B. The weighting of a factor can be decreased if a shared word file or a chat message indicates by text or by any other data that editing time of the content is a lower priority.

In some configurations, a system displays groups of users that each share a common activity factor. For example, participants can be part of a group displayed in a UI or screen if they each share a location, a role, a set of permissions, a team, a contribution level, etc. Thus, the routine can include a method configured for execution on a system 700, comprising an operation for analyzing contextual data 114 defining activity factors 150 for individual users 10A-10F each associated with individual video streams of a plurality of video streams 634, wherein the analysis of the contextual data 114 determines individual user groups 140 having individual users each having a common activity factor 150, wherein the common activity factor can be based on at least one of a common location, a common role, a common organization team, or a common contribution level. The method can also include generating of communication data 639 for causing one or more computing devices 11A-11F to generate one or more user interfaces 101 comprising a first display area 105A and a second display area 105B, wherein the first display area 105A is reserved for, and configured to display, renderings 111A-111C of a first set of video streams 634 depicting individual users 10A-10C of a first user group 140A associated with a first activity factor 150A, wherein the second display area 105B is reserved for, and configured to display, renderings 111D-111F of a second set of video streams 634 depicting individual users 10D-10F of a second user group 140B associated with a second activity factor 150B, wherein the first display area 105A includes a first screen sharing area 112A reserved for, and configured to display, a rendering of a first content controlled by at least one user of the first user group 140A, wherein the second display area 105B includes a second screen sharing area 112B reserved for, and configured to display, a rendering of a second content controlled by at least one user of the second user group 140B. The method can also include causing a transmission of the communication data 639 comprising the plurality of streams 111 to the one or more computing devices 111A-111F, the communication data 639 causing the one or more computing devices 11A-11F to display the one or more user interfaces 101 concurrently displaying the first display area 105A and the second display area 105B, wherein the communication data 639 causes the one or more computing devices 11A-11F to display the renderings 111A-111C of the first set of video streams 634 depicting individual users 10A-10C associated with a first activity factor 150A and the rendering of the first content in the first screen sharing area 112A that is controlled by the at least one user of the first user group 140A within the first display area 105A, wherein the communication data 639 causes the one or more computing devices 11A-11F to display the renderings 111D-111F of the second set of video streams 634 depicting individual users 10D-10F associated with the second activity factor 150B within the second display area 105B and the rendering of the second content in the second screen sharing area 112B that is controlled by the at least one user of the second user group 140B, wherein the first content and the second content are concurrently displayed.

In some configurations, with reference to FIG. 3C, the method can cause a transition based on a selection of a location-based group from another type of group. It can be appreciated that the transition to another UI arrangement can be based on a selection of another type of group, such as a team-based group, a contribution-based group, etc. For example, the method can include an operation of receiving updated contextual data defining updated activity factors for individual users 10A-10F, wherein the updated activity factors comprise a third activity factor and a fourth activity factor that each indicate separate locations, wherein the first activity factor and the second activity factor each indicate individual teams, individual permissions, or individual roles. In response to the updated activity factors, causing the one or more computing devices 11A-11F to display an updated user interface 101 concurrently displaying a first updated display area 105A and a second updated display area 105B. The first updated display area 105A is reserved for, and configured to display, renderings 111D, 111B, 111E of a third set of video streams depicting a third set of individual users 10D, 10B, 10E associated with the third activity factor and a rendering of a third set of content in a third screen sharing area that is controlled by the at least one user of the third set of individual users. The second updated display area 105B is reserved for, and configured to display, renderings 111A, 111C, 111F of a fourth set of video streams depicting a fourth set of individual users 10A, 10C, 10F associated with the fourth activity factor and a rendering of a fourth set of content in a fourth screen sharing area that is controlled by the at least one user of the fourth set of individual users.

In some configurations, the method can provide groups within groups, as described above with respect to FIG. 3C. The renderings of the first set of video streams are each arranged within the first display area according to a third activity factor, and wherein the second set of video streams are each arranged within the second display area according to a fourth activity factor.

In some configurations, the method can provide a user interface where audience members are pictured in Together Mode, as shown in FIG. 6. The first activity factor 150A includes a presenter role of the communication session, and the second activity factor includes an audience role of the communication session, wherein the second display area configures the renderings 111D-111F of the second set of video streams 634 depicting individual users 10D-10F in positions associated with a seating arrangement of a virtual environment.

In some configurations, the method can provide a user interface where groupings are made by contribution levels to content, as described above with respect to FIGS. 7A-7B. For instance, in the method described above, the activity factor is based on a level of contribution to the first content, and wherein the second activity factor is based on a level of contribution to the second content.

In some configurations, the method can provide a user interface where groupings are based on multiple factors, as described above with respect to FIGS. 7A-7B. For instance, the first activity factor is based on a first value indicating at least one of a first role, a first location, or a first contribution level to the first content for the at least one user of the first set of users, wherein the second activity factor is based on a second value indicating at least one of a second role, a second location, or a second contribution level to the second content for the at least one user of the second set of users.

In some configurations, the method can limit the number of displayed groups based on the number of display monitors. For instance, the method can include receiving hardware data indicating a number of display devices in communication with the system, wherein the communication data causes the first display area 105A to be displayed on a first display device and the second display area 105B to be displayed on a second display device, where in the communication data limits the number of displayed user groups based on the number of display devices. The groups can also be limited per display device. For instance, an individual device can be limited to one, two, or three or more groups. Thus, a five display monitor system can display 6 groups total if one display monitor is limited to two groups based on the fact that the size of the screen is above a threshold, and the other display monitors that are below the size threshold can be limited to one group per display monitor.

Figure 9:
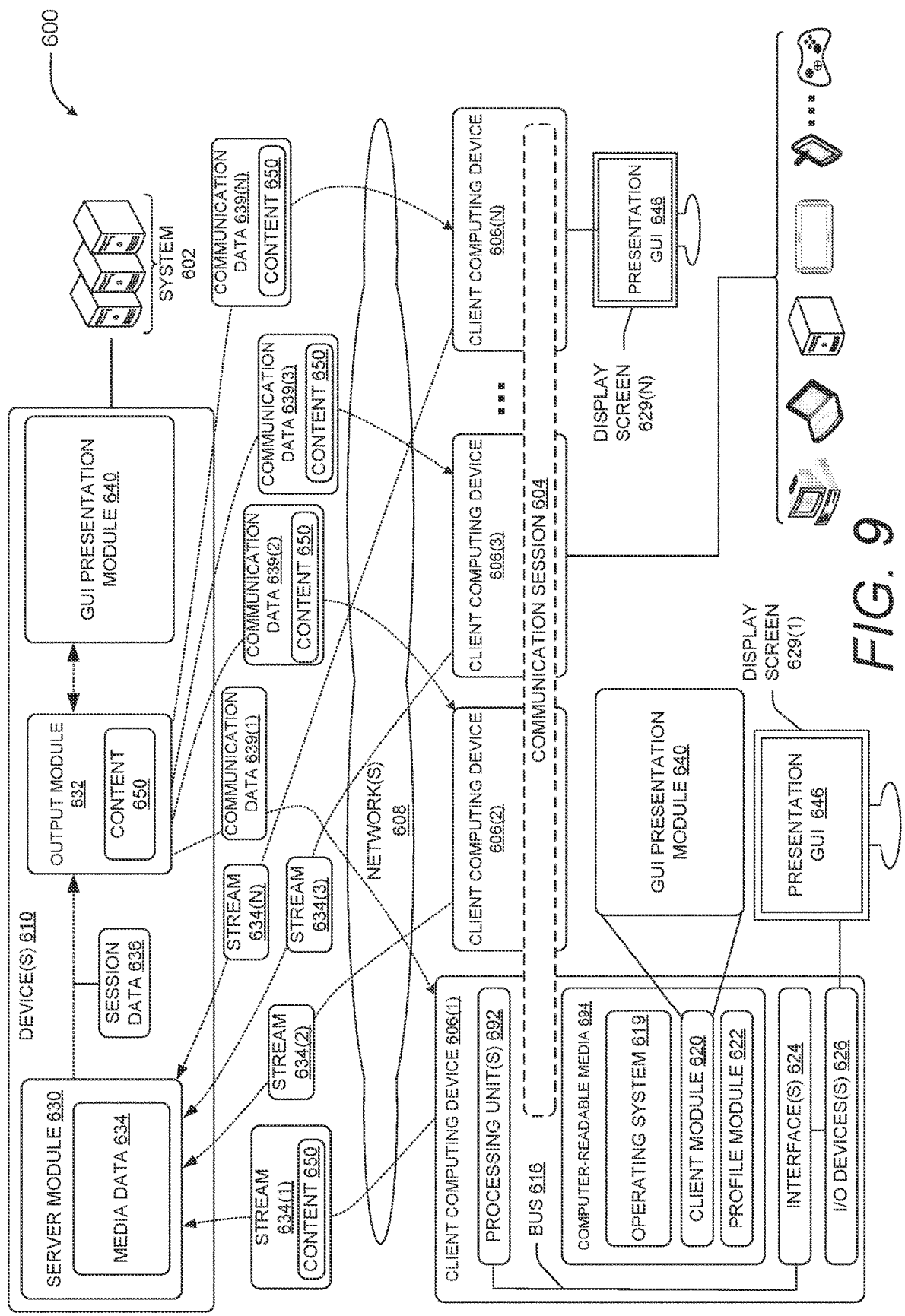
FIG. 9 is a computing system diagram showing aspects of an illustrative operating environment for the techniques disclosed herein.

FIG. 9 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs.

In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 9 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.1 in, 802.11 ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 9 illustrates that client computing device 606(1) is in some way connected to a display device (e.g., a display screen 629(N)), which can display a UI according to the techniques described herein.

In the example environment 600 of FIG. 9, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 9) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 9, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such a image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different than the general communication session.

Figure 10:
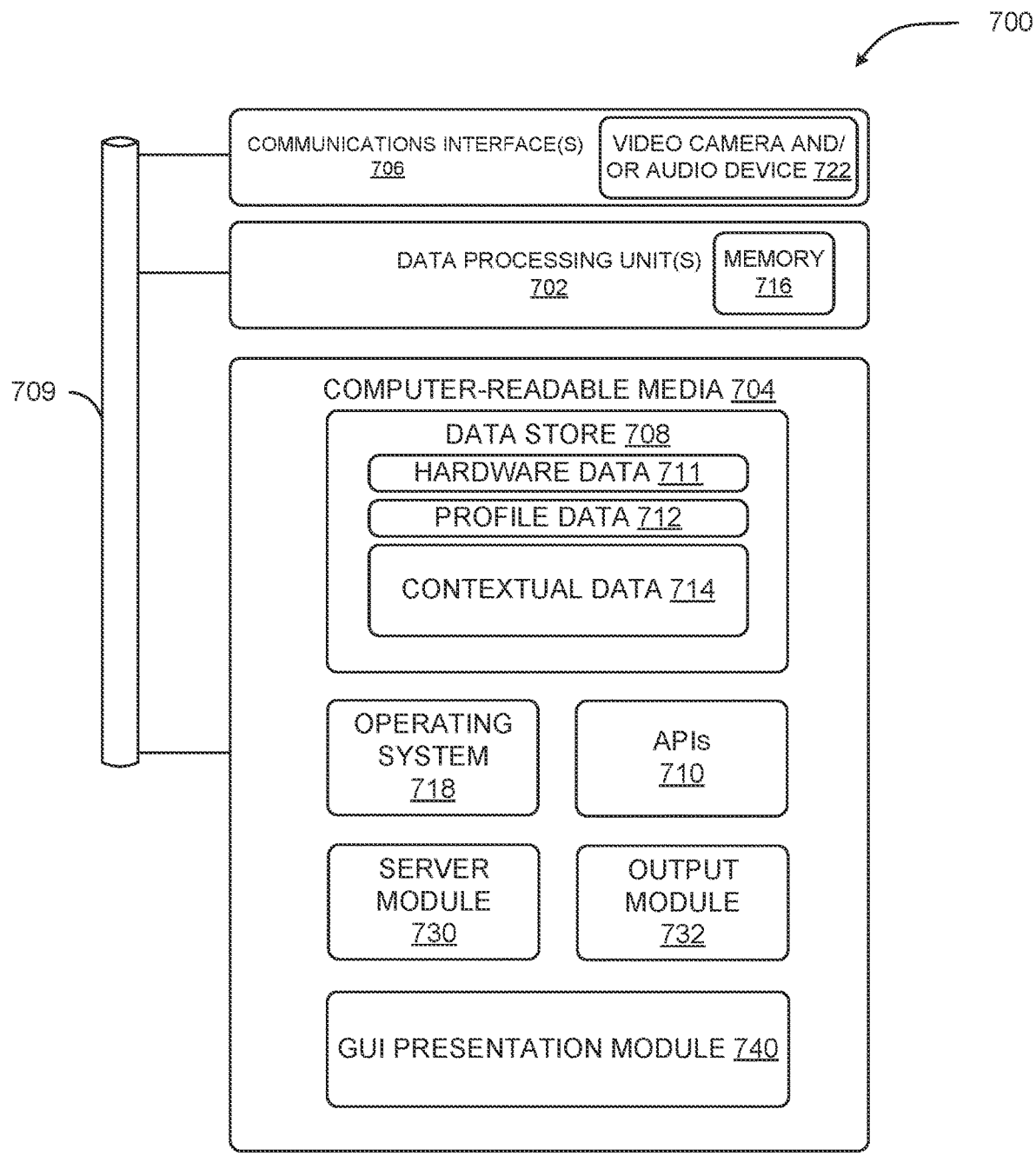
FIG. 10 is a computing architecture diagram showing aspects of the configuration and operation of a computing device that can implement aspects of the techniques disclosed herein.

FIG. 10 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as non-transitory computer-readable storage media or as a non-transitory computer-readable medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 9), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can defined aspects of any device, such as a number of display screens of a computer. The contextual data 714 (also referred to as contextual data 114) can define activity factors 150 for individual users 10A-10F each associated with individual video streams of a plurality of video streams 634, wherein the analysis of the contextual data 714 determines individual user groups 140 having individual users each having a common activity factor 150, wherein the common activity factor can be based on at least one of a common location, a common role, a common organization team, or a common contribution level.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary higher or lower. That is, functionality described herein in association with the illustrated modules may be performed by a fewer number of modules or a larger number of modules on one device or spread across multiple devices In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method configured for execution on a system, comprising:

analyzing contextual data defining activity factors for individual users each associated with individual video streams of a plurality of video streams, wherein the analysis of the contextual data determines individual user groups having individual users each having a common activity factor, wherein the common activity factor is based on at least one of a common location, a common role, a common organization team, or a common contribution level;

generating of communication data for causing one or more computing devices to generate one or more user interfaces comprising a first display area and a second display area, wherein the first display area is reserved for, and configured to display, renderings of a first set of video streams depicting individual users of a first user group associated with a first activity factor, wherein the second display area is reserved for, and configured to display, renderings of a second set of video streams depicting individual users of a second user group associated with a second activity factor, wherein the first display area includes a first screen sharing area reserved for, and configured to display, a rendering of a first content controlled by at least one user of the first user group, wherein the second display area includes a second screen sharing area reserved for, and configured to display, a rendering of a second content controlled by at least one user of the second user group; and causing a transmission of the communication data comprising the plurality of streams to the one or more computing devices, the communication data causing the one or more computing devices to display the one or more user interfaces concurrently displaying the first display area and the second display area, wherein the communication data causes the one or more computing devices to display the renderings of the first set of video streams depicting individual users associated with a first activity factor and the rendering of the first content in the first screen sharing area that is controlled by the at least one user of the first user group within the first display area, wherein the communication data causes the one or more computing devices to display the renderings of the second set of video streams depicting individual users associated with the second activity factor within the second display area and the rendering of the second content in the second screen sharing area that is controlled by the at least one user of the second user group, wherein the first content and the second content are concurrently displayed.

2. The method of claim 1, further comprising:

receiving updated contextual data defining updated activity factors for individual users, wherein the updated activity factors comprise a third activity factor and a fourth activity factor that each indicate separate locations, wherein the first activity factor and the second activity factor each indicate individual teams, individual permissions, or individual roles; and in response to the updated activity factors, causing the one or more computing devices to display an updated user interface concurrently displaying a first updated display area and a second updated display area, wherein the first updated display area is reserved for, and configured to display, renderings of a third set of video streams depicting a third set of individual users associated with the third activity factor and a rendering of a third set of content in a third screen sharing area that is controlled by the at least one user of the third set of individual users, wherein the second updated display area is reserved for, and configured to display, renderings of a fourth set of video streams depicting a fourth set of individual users associated with the fourth activity factor and a rendering of a fourth set of content in a fourth screen sharing area that is controlled by the at least one user of the fourth set of individual users.

3. The method of claim 1, wherein the renderings of the first set of video streams are each arranged within the first display area according to a third activity factor, and wherein the second set of video streams are each arranged within the second display area according to a fourth activity factor.

4. The method of claim 1, wherein the first activity factor includes a presenter role of the communication session, and the second activity factor includes an audience role of the communication session, wherein the second display area configures the renderings of the second set of video streams depicting individual users in positions associated with a seating arrangement of a virtual environment.

5. The method of claim 1, wherein the first activity factor is based on a level of contribution to the first content, and wherein the second activity factor is based on a level of contribution to the second content.

6. The method of claim 1, wherein the first activity factor is based on a first value indicating at least one of a first role, a first location, or a first contribution level to the first content for the at least one user of the first set of users, wherein the second activity factor is based on a second value indicating at least one of a second role, a second location, or a second contribution level to the second content for the at least one user of the second set of users.

7. The method of claim 1, further comprising, receiving hardware data indicating a number of display devices in communication with the system, wherein the communication data causes the first display area to be displayed on a first display device and the second display area to be displayed on a second display device, where in the communication data limits the number of displayed user groups based on the number of display devices.

8. A computing device, comprising:
one or more processing units; and
a computer-readable storage medium having encoded thereon computer-executable instructions to cause the one or more processing units to perform a method comprising:

analyzing contextual data defining activity factors for individual users each associated with individual video streams of a plurality of video streams, wherein the analysis of the contextual data determines individual user groups having individual users each having a common activity factor, wherein the common activity factor is based on at least one of a common location, a common role, a common organization team, or a common contribution level;

generating of communication data for causing one or more computing devices to generate one or more user interfaces comprising a first display area and a second display area, wherein the first display area is reserved for, and configured to display, renderings of a first set of video streams depicting individual users of a first user group associated with a first activity factor, wherein the second display area is reserved for, and configured to display, renderings of a second set of video streams depicting individual users of a second user group associated with a second activity factor, wherein the first display area includes a first screen sharing area reserved for, and configured to display, a rendering of a first content controlled by at least one user of the first user group, wherein the second display area includes a second screen sharing area reserved for, and configured to display, a rendering of a second content controlled by at least one user of the second user group; and causing a transmission of the communication data comprising the plurality of streams to the one or more computing devices, the communication data causing the one or more computing devices to display the one or more user interfaces concurrently displaying the first display area and the second display area, wherein the communication data causes the one or more computing devices to display the renderings of the first set of video streams depicting individual users associated with a first activity factor and the rendering of the first content in the first screen sharing area that is controlled by the at least one user of the first user group within the first display area, wherein the communication data causes the one or more computing devices to display the renderings of the second set of video streams depicting individual users associated with the second activity factor within the second display area and the rendering of the second content in the second screen sharing area that is controlled by the at least one user of the second user group, wherein the first content and the second content are concurrently displayed.

9. The system of claim 8, wherein the method further comprises:

receiving updated contextual data defining updated activity factors for individual users, wherein the updated activity factors comprise a third activity factor and a fourth activity factor that each indicate separate locations, wherein the first activity factor and the second activity factor each indicate individual teams, individual permissions, or individual roles; and in response to the updated activity factors, causing the one or more computing devices to display an updated user interface concurrently displaying a first updated display area and a second updated display area, wherein the first updated display area is reserved for, and configured to display, renderings of a third set of video streams depicting a third set of individual users associated with the third activity factor and a rendering of a third set of content in a third screen sharing area that is controlled by the at least one user of the third set of individual users, wherein the second updated display area is reserved for, and configured to display, renderings of a fourth set of video streams depicting a fourth set of individual users associated with the fourth activity factor and a rendering of a fourth set of content in a fourth screen sharing area that is controlled by the at least one user of the fourth set of individual users.

10. The system of claim 8, wherein the renderings of the first set of video streams are each arranged within the first display area according to a third activity factor, and wherein the second set of video streams are each arranged within the second display area according to a fourth activity factor.

11. The system of claim 8, wherein the first activity factor includes a presenter role of the communication session, and the second activity factor includes an audience role of the communication session, wherein the second display area configures the renderings of the second set of video streams depicting individual users in positions associated with a seating arrangement of a virtual environment.

12. The system of claim 8, wherein the first activity factor is based on a level of contribution to the first content, and wherein the second activity factor is based on a level of contribution to the second content.

13. The system of claim 8, wherein the first activity factor is based on a first value indicating at least one of a first role, a first location, or a first contribution level to the first content for the at least one user of the first set of users, wherein the second activity factor is based on a second value indicating at least one of a second role, a second location, or a second contribution level to the second content for the at least one user of the second set of users.

14. The system of claim 8, wherein the method further comprises: receiving hardware data indicating a number of display devices in communication with the system, wherein the communication data causes the first display area to be displayed on a first display device and the second display area to be displayed on a second display device, where in the communication data limits the number of displayed user groups based on the number of display devices.

15. A computing device, comprising:
means for analyzing contextual data defining activity factors for individual users each associated with individual video streams of a plurality of video streams, wherein the analysis of the contextual data determines individual user groups having individual users each having a common activity factor, wherein the common activity factor is based on at least one of a common location, a common role, a common organization team, or a common contribution level;
means for generating of communication data for causing one or more computing devices to generate one or more user interfaces comprising a first display area and a second display area, wherein the first display area is reserved for, and configured to display, renderings of a first set of video streams depicting individual users of a first user group associated with a first activity factor, wherein the second display area is reserved for, and configured to display, renderings of a second set of video streams depicting individual users of a second user group associated with a second activity factor, wherein the first display area includes a first screen sharing area reserved for, and configured to display, a rendering of a first content controlled by at least one user of the first user group, wherein the second display area includes a second screen sharing area reserved for, and configured to display, a rendering of a second content controlled by at least one user of the second user group; and
means for causing a transmission of the communication data comprising the plurality of streams to the one or more computing devices, the communication data causing the one or more computing devices to display the one or more user interfaces concurrently displaying the first display area and the second display area, wherein the communication data causes the one or more computing devices to display the renderings of the first set of video streams depicting individual users associated with a first activity factor and the rendering of the first content in the first screen sharing area that is controlled by the at least one user of the first user group within the first display area, wherein the communication data causes the one or more computing devices to display the renderings of the second set of video streams depicting individual users associated with the second activity factor within the second display area and the rendering of the second content in the second screen sharing area that is controlled by the at least one user of the second user group, wherein the first content and the second content are concurrently displayed.

16. The system of claim 15, further comprising:
means for receiving updated contextual data defining updated activity factors for individual users, wherein the updated activity factors comprise a third activity factor and a fourth activity factor that each indicate separate locations, wherein the first activity factor and the second activity factor each indicate individual teams, individual permissions, or individual roles; and
means for causing the one or more computing devices to display an updated user interface concurrently displaying a first updated display area and a second updated display area, wherein the display of the updated user interface is in response to the updated activity factors,
wherein the first updated display area is reserved for, and configured to display, renderings of a third set of video streams depicting a third set of individual users associated with the third activity factor and a rendering of a third set of content in a third screen sharing area that is controlled by the at least one user of the third set of individual users,
wherein the second updated display area is reserved for, and configured to display, renderings of a fourth set of video streams depicting a fourth set of individual users associated with the fourth activity factor and a rendering of a fourth set of content in a fourth screen sharing area that is controlled by the at least one user of the fourth set of individual users.

17. The system of claim 15, wherein the renderings of the first set of video streams are each arranged within the first display area according to a third activity factor, and wherein the second set of video streams are each arranged within the second display area according to a fourth activity factor.

18. The system of claim 15, wherein the first activity factor includes a presenter role of the communication session, and the second activity factor includes an audience role of the communication session, wherein the second display area configures the renderings of the second set of video streams depicting individual users in positions associated with a seating arrangement of a virtual environment.

19. The system of claim 15, wherein the first activity factor is based on a level of contribution to the first content, and wherein the second activity factor is based on a level of contribution to the second content.

20. The system of claim 15, wherein the first activity factor is based on a first value indicating at least one of a first role, a first location, or a first contribution level to the first content for the at least one user of the first set of users, wherein the second activity factor is based on a second value indicating at least one of a second role, a second location, or a second contribution level to the second content for the at least one user of the second set of users.

\* \* \* \* \*